US012634595B2

(12) United States Patent
Torii

(10) Patent No.: US 12,634,595 B2
(45) Date of Patent: May 19, 2026

(54) IMAGING ELEMENT AND IMAGING DEVICE

(71) Applicant: SONY SEMICONDUCTOR SOLUTIONS CORPORATION, Kanagawa (JP)

(72) Inventor: Yusaku Torii, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 348 days.

(21) Appl. No.: 18/043,770

(22) PCT Filed: Sep. 6, 2021

(86) PCT No.: PCT/JP2021/032588
§ 371 (c)(1),
(2) Date: Mar. 2, 2023

(87) PCT Pub. No.: WO2022/054742
PCT Pub. Date: Mar. 17, 2022

(65) Prior Publication Data
US 2024/0031691 A1      Jan. 25, 2024

(30) Foreign Application Priority Data

Sep. 14, 2020    (JP) ................................. 2020-153670

(51) Int. Cl.
*H04N 25/40*         (2023.01)
*G06V 10/44*         (2022.01)
*G06V 10/75*         (2022.01)

(52) U.S. Cl.
CPC ........... *H04N 25/40* (2023.01); *G06V 10/454* (2022.01); *G06V 10/751* (2022.01)

(58) Field of Classification Search
CPC ........ H04N 25/40; H04N 25/00; H04N 25/78; H04N 25/46; H04N 25/77; H04N 25/79;
(Continued)

(56) References Cited

U.S. PATENT DOCUMENTS

| | | | | |
|---|---|---|---|---|
| 6,552,746 B1 * | 4/2003 | Yang | ...................... | H04N 25/46 |
| | | | | 348/E3.018 |
| 8,390,715 B2 * | 3/2013 | Matsunaga | ............ | H04N 25/67 |
| | | | | 348/308 |

(Continued)

FOREIGN PATENT DOCUMENTS

| | | |
|---|---|---|
| CN | 108781265 A | 11/2018 |
| CN | 109978161 A | 7/2019 |

(Continued)

OTHER PUBLICATIONS

International Search Report and Written Opinion of PCT Application No. PCT/JP2021/032588, issued on Oct. 26, 2021, 09 pages of ISRWO.

*Primary Examiner* — Michael S Osinski
(74) *Attorney, Agent, or Firm* — CHIP LAW GROUP

(57) ABSTRACT

Provided is an imaging element according to an embodiment of the present disclosure that includes an imaging section in which a plurality of pixels individually including a photoelectric conversion element is arranged in a matrix, a convolution circuit that performs convolution processing on a plurality of pixel signals, which are analog signals each output from the plurality of pixels, on a basis of a convolution coefficient, and a pooling circuit that performs pooling processing on the plurality of pixel signals that has been subjected to the convolution processing.

10 Claims, 19 Drawing Sheets

(58) Field of Classification Search

CPC ...... H04N 23/61; H04N 25/76; H04N 25/533; H04N 25/767; H04N 25/771; G06V 10/454; G06V 10/751; G06V 10/82; G06V 10/94; G06V 10/764; G06V 30/19173; G06V 40/161; G06V 10/25; G06V 10/7715; G06N 3/045; G06N 3/04; G06N 3/063; G06N 3/08; G06N 3/048; G06N 3/084; G06N 3/02; G06N 3/065; G06F 18/214; G06F 18/24; G06F 17/16; G06T 2207/20084; G06T 2207/20081; G06T 7/11; G06T 1/20

See application file for complete search history.

(56) References Cited

U.S. PATENT DOCUMENTS

| | | | | |
|---|---|---|---|---|
| 10,223,611 | B1 * | 3/2019 | Price | G06F 18/24 |
| 10,275,646 | B2 * | 4/2019 | Yang | G06V 10/454 |
| 10,322,510 | B2 * | 6/2019 | Jiang | G06V 10/25 |
| 10,685,235 | B2 * | 6/2020 | Ananthanarayanan | |
| | | | | G06F 18/214 |
| 11,388,360 | B2 * | 7/2022 | Yamamoto | H10D 30/67 |
| 11,403,069 | B2 * | 8/2022 | Bannon | G06N 3/045 |
| 11,783,587 | B2 * | 10/2023 | Yang | G06V 20/52 |
| | | | | 382/103 |
| 11,893,393 | B2 * | 2/2024 | Talpes | G06F 9/30036 |
| 12,010,418 | B2 * | 6/2024 | Fujiwara | G06N 3/063 |
| 12,088,942 | B2 * | 9/2024 | Asakura | H10F 39/8057 |
| 12,093,831 | B2 * | 9/2024 | Yamazaki | G06N 3/045 |
| 12,225,314 | B2 * | 2/2025 | Yoneda | H04N 25/771 |
| 12,243,284 | B2 * | 3/2025 | Han | G06V 10/82 |
| 12,260,614 | B2 * | 3/2025 | Keum | G06V 10/7747 |
| 12,307,350 | B2 * | 5/2025 | Bannon | G06V 10/82 |
| 2015/0309961 | A1 * | 10/2015 | Ozaki | G06F 17/15 |
| | | | | 706/16 |
| 2016/0140424 | A1 * | 5/2016 | Wang | G06F 18/2414 |
| | | | | 382/156 |
| 2017/0220904 | A1 * | 8/2017 | Bai | G06V 10/774 |
| 2018/0032857 | A1 * | 2/2018 | Lele | G06N 3/084 |
| 2018/0150740 | A1 * | 5/2018 | Wang | G06V 40/168 |
| 2018/0165574 | A1 * | 6/2018 | Young | G06F 7/5443 |
| 2018/0198994 | A1 * | 7/2018 | Cardinaux | H04N 23/95 |
| 2019/0034748 | A1 * | 1/2019 | Matsumoto | G06N 3/045 |
| 2019/0073562 | A1 * | 3/2019 | Stolikj | G06F 18/24143 |
| 2019/0164290 | A1 * | 5/2019 | Wang | G06N 3/08 |
| 2019/0204448 | A1 * | 7/2019 | Eki | H10F 39/12 |
| 2019/0205780 | A1 * | 7/2019 | Sakaguchi | G06V 10/454 |
| 2019/0228497 | A1 * | 7/2019 | Muramatsu | H04N 25/78 |
| 2019/0266387 | A1 * | 8/2019 | Sun | G06N 3/08 |
| 2019/0356821 | A1 * | 11/2019 | Qiao | H04N 5/14 |
| 2020/0026956 | A1 * | 1/2020 | Kumar | G06F 18/2431 |
| 2020/0082253 | A1 * | 3/2020 | Park | G06N 3/04 |
| 2020/0110985 | A1 * | 4/2020 | Kataeva | G06V 10/82 |
| 2020/0110991 | A1 * | 4/2020 | Kataeva | G06N 20/00 |
| 2020/0218938 | A1 * | 7/2020 | Stolikj | G06V 40/172 |
| 2020/0285954 | A1 * | 9/2020 | Li | G06N 3/063 |
| 2021/0012177 | A1 * | 1/2021 | Yang | G06V 10/82 |
| 2021/0042560 | A1 * | 2/2021 | Wu | G06N 3/045 |
| 2021/0142106 | A1 * | 5/2021 | Quader | G06N 3/09 |
| 2021/0287070 | A1 * | 9/2021 | Chen | G06N 3/045 |
| 2021/0350205 | A1 * | 11/2021 | Yan | G06N 3/04 |
| 2021/0365716 | A1 * | 11/2021 | Li | G06V 10/764 |
| 2022/0094842 | A1 * | 3/2022 | Fujiwara | H04N 25/77 |
| 2022/0224846 | A1 * | 7/2022 | Hasegawa | H04N 23/667 |
| 2022/0360727 | A1 * | 11/2022 | Eki | G06N 3/02 |
| 2022/0392038 | A1 * | 12/2022 | Sun | G06T 5/70 |
| 2022/0400222 | A1 * | 12/2022 | Nakagawa | H04N 25/41 |
| 2023/0109354 | A1 * | 4/2023 | Ito | G06F 12/06 |
| | | | | 708/190 |

FOREIGN PATENT DOCUMENTS

| | | |
|---|---|---|
| CN | 110741630 A | 1/2020 |
| CN | 111149352 A | 5/2020 |
| CN | 111382859 A | 7/2020 |
| JP | 2012-227695 A | 11/2012 |
| JP | 2018129796 A | 8/2018 |
| JP | 2019-161665 A | 9/2019 |
| JP | 2020-123975 A | 8/2020 |
| WO | WO-2019201657 A1 | 10/2019 |

* cited by examiner

FIG.3

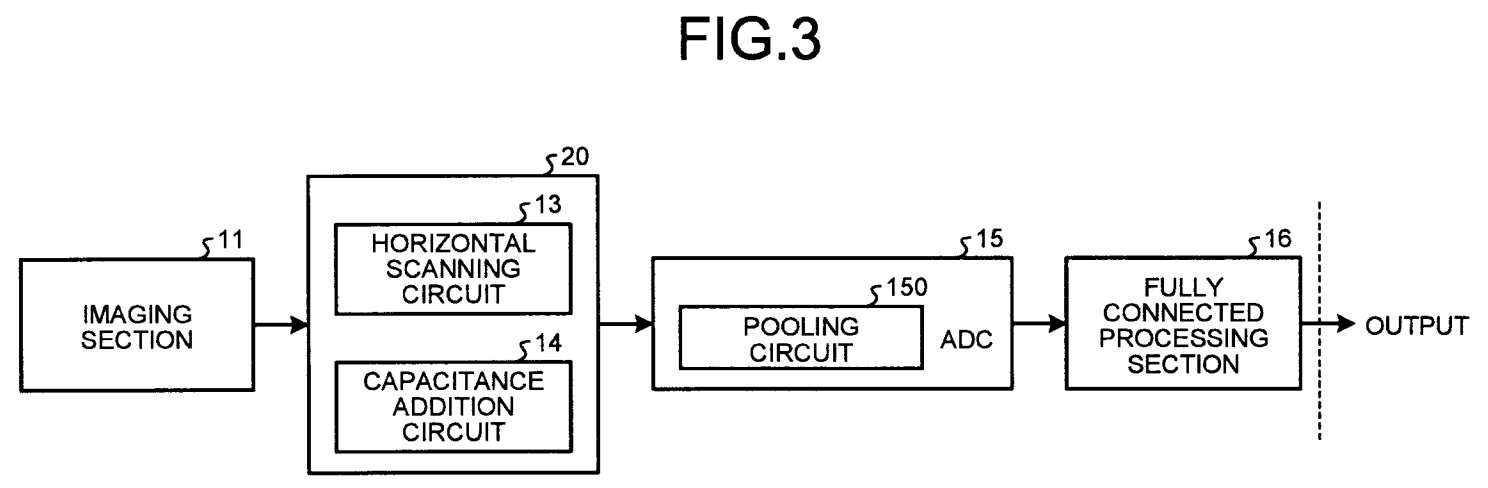

IMAGING
SECTION
~11

~20
HORIZONTAL
SCANNING
CIRCUIT
~13

CAPACITANCE
ADDITION
CIRCUIT
~14

~15
ADC
POOLING
CIRCUIT
~150

FULLY
CONNECTED
PROCESSING
SECTION
~16

OUTPUT

Figure 6:
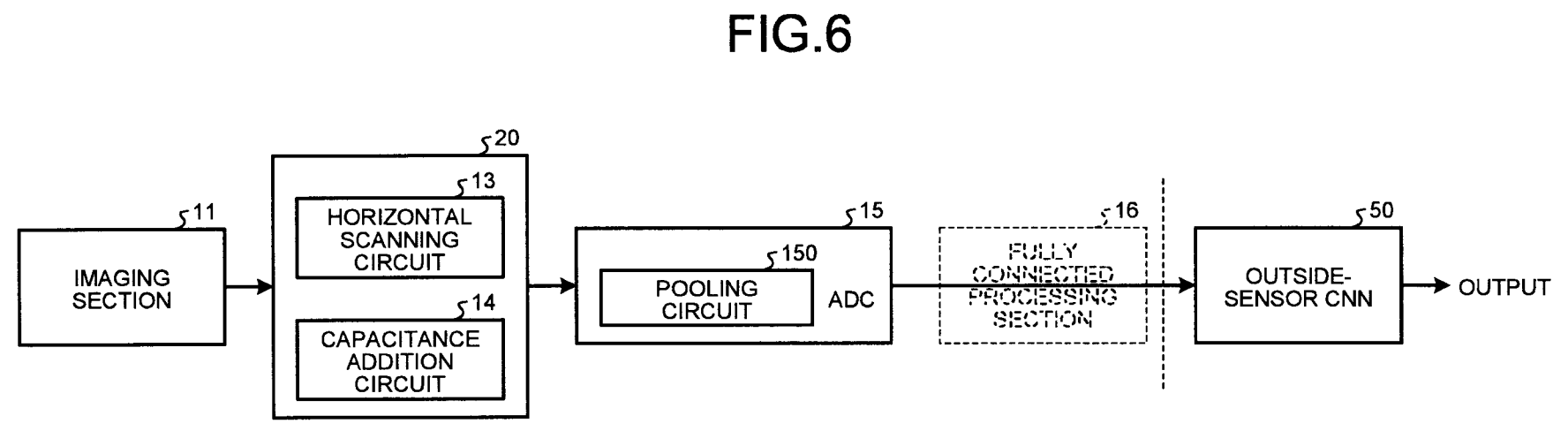

IMAGING SECTION — 11

20 —
HORIZONTAL SCANNING CIRCUIT — 13
CAPACITANCE ADDITION CIRCUIT — 14

ADC — 15
POOLING CIRCUIT — 150

FULLY CONNECTED PROCESSING SECTION — 16

OUTSIDE-SENSOR CNN — 50

OUTPUT

FIG. 13A

| 2 | 0 | 1 |  |
|---|---|---|---|
| 0 | 1 | 0 |  |
| 1 | 0 | 1 |  |

FIG. 13B

|  | 2 | 0 | 1 |
|---|---|---|---|
|  | 0 | 1 | 0 |
|  | 1 | 0 | 1 |

FIG.18

IMAGING ELEMENT AND IMAGING DEVICE

CROSS REFERENCE TO RELATED APPLICATIONS

This application is a U.S. National Phase of International Patent Application No. PCT/JP2021/032588 filed on Sep. 6, 2021, which claims priority benefit of Japanese Patent Application No. JP 2020-153670 filed in the Japan Patent Office on Sep. 14, 2020. Each of the above-referenced applications is hereby incorporated herein by reference in its entirety.

FIELD

The present disclosure relates to an imaging element and an imaging device.

BACKGROUND

Convolutional neural networks (CNNs) are actively used in the field of image recognition. In the CNN processing, a received input image reaches a fully connected layer (FC layer) through a convolution layer and a pooling layer. For example, when an image is output from a contact image sensor (CIS) and image recognition (for example, character recognition and object recognition) using a CNN is performed, a system outside the CIS is essential. In addition, the CNN may require a high-specification graphics processing unit (GPU) depending on a processing content. When real-time processing is intended to be performed, an image recognition system may become large.

CITATION LIST

Patent Literature

Patent Literature 1: JP 2012-227695 A

SUMMARY

Technical Problem

In order to simplify an image recognition system, implementing a CNN in CIS logic processing is conceivable. Convolution and pooling operation are, however, bottlenecks. Performing processing in a realistic time is difficult. A lead time for recognizing an image is increased. Therefore, it is demanded to shorten the lead time for recognizing an image while simplifying the image recognition system.

Therefore, the present disclosure provides an imaging element and an imaging device capable of simplifying an image recognition system and shortening a lead time.

Solution to Problem

An imaging element according to an embodiment of the present disclosure includes: an imaging section in which a plurality of pixels individually including a photoelectric conversion element is arranged in a matrix; a convolution circuit that performs convolution processing on a plurality of pixel signals, which are analog signals each output from the plurality of pixels, on a basis of a convolution coefficient; and a pooling circuit that performs pooling processing on the plurality of pixel signals that has been subjected to the convolution processing.

BRIEF DESCRIPTION OF DRAWINGS

FIG. 3 is a block diagram depicting a flow of CNN operation of the imaging element according to the first embodiment.

FIG. 4 is a block diagram depicting a flow of CNN learning related to the CNN operation in FIG. 3.

FIG. 6 is a block diagram depicting a flow of a variation of the CNN operation of the imaging element according to the first embodiment.

FIGS. 13A and 13B depict slides of a convolution filter according to a third embodiment.

FIG. 18 is a block diagram depicting an example of schematic configuration of a vehicle control system.

DESCRIPTION OF EMBODIMENTS

Embodiments of the present disclosure will be described in detail below with reference to the drawings. Incidentally, in the following embodiments, the same reference signs are attached to the same parts, so that duplicate description will be omitted.

In addition, the present disclosure will be described in accordance with the following item order.

1. First Embodiment 1-1. Example of Schematic Configuration of Imaging Element 1-2. Example of Schematic Configuration of Pixel 1-3. CNN Operation Example and Normal Image Output Operation Example of Imaging Element 1-4. Example of Schematic Configuration of Convolution Circuit 1-5. Example of Schematic Configuration of AD Conversion Circuit Including Pooling Circuit 1-6. Actions/Effects 2. Second Embodiment 3. Third Embodiment 4. Other Embodiments 5. Application Example 6. Applications 7. Appendix

1. FIRST EMBODIMENT

<1-1. Example of Schematic Configuration of Imaging Device>

Figure 1:
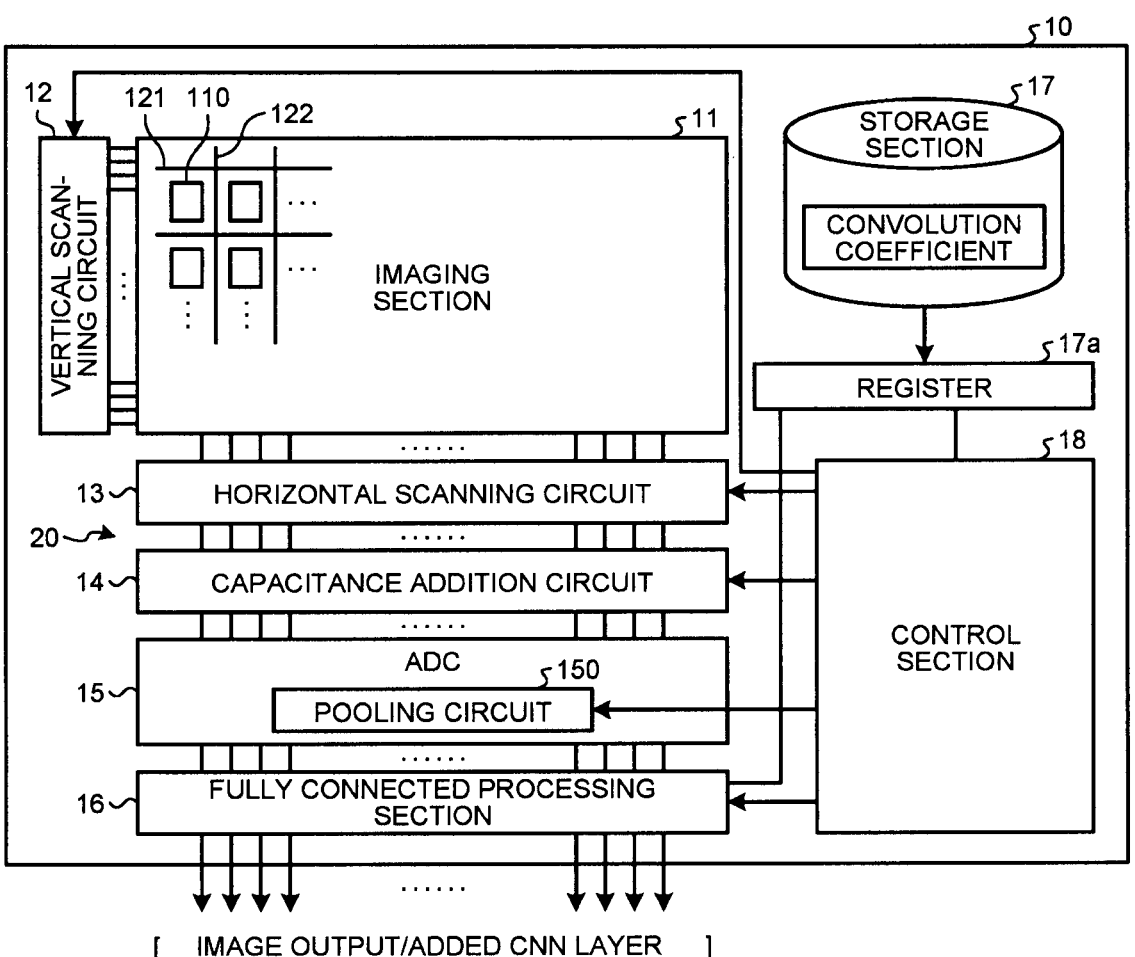
FIG. 1 is a block diagram depicting an example of a schematic configuration of an imaging element according to a first embodiment.

FIG. 1 is a block diagram depicting an example of a schematic configuration of an imaging element 10 according to a first embodiment. As depicted in FIG. 1, the imaging element 10 includes an imaging section (pixel array section) 11, a vertical scanning circuit 12, a horizontal scanning circuit 13, a capacitance addition circuit (addition circuit) 14, an analog to digital (AD) conversion circuit 15, a fully connected processing section 16, a storage section 17, and a control section 18. The imaging element 10 is, for example, a complementary metal oxide semiconductor (CMOS) image sensor. The imaging element 10 is incorporated in various imaging devices such as a CIS, for example.

The imaging section 11 includes a plurality of pixels 110 capable of performing photoelectric conversion. These pixels 110 are arranged in a two-dimensional lattice pattern in a vertical direction (column direction) and a horizontal direction (row direction). In FIG. 1, an arrangement in the vertical direction is defined as a column, and an arrangement in the horizontal direction is defined as a row. Each row is also referred to as a line. Each column is also referred to as a column. A pixel signal line 121 is connected to each pixel 110 for each row. A vertical signal line 122 is connected to each pixel 110 for each column. Each pixel signal line 121 is connected to the vertical scanning circuit 12. Each vertical signal line 122 is connected to the horizontal scanning circuit 13. For example, the pixel signal line 121 or the vertical signal line 122 includes a plurality of signal lines.

Under the control of the control section 18, the vertical scanning circuit 12 transmits various signals such as a drive pulse for reading a pixel signal from a pixel 110 to the imaging section 11 via each pixel signal line 121. For example, the vertical scanning circuit 12 supplies various signals such as a drive pulse to each pixel 110 via the pixel signal line 121 for each line, and causes each pixel 110 to output a pixel signal to the vertical signal line 122. That is, each pixel 110 is driven for each line by a drive signal supplied from the vertical scanning circuit 12 via the pixel signal line 121. The vertical scanning circuit 12 includes, for example, a shift register and an address decoder.

Under the control of the control section 18, the horizontal scanning circuit 13 scans the pixel signal output (read) by each pixel 110 in the horizontal direction (line direction), and outputs each pixel signal to the capacitance addition circuit 14. In addition, under the control of the control section 18, the horizontal scanning circuit 13 controls the connection between each vertical signal line 122 and the capacitance addition circuit 14 in accordance with processing to be executed. For example, when normal image output processing of outputting a normal image is performed, the horizontal scanning circuit 13 connects all the vertical signal lines 122 with the capacitance addition circuit 14. In addition, when CNN processing is performed, the horizontal scanning circuit 13 controls the connection between each vertical signal line 122 and the capacitance addition circuit 14 on the basis of a convolution coefficient stored in the storage section 17 (details will be described later).

Under the control of the control section 18, the capacitance addition circuit 14 outputs the pixel signal output from each pixel 110 to the AD conversion circuit (ADC) 15 in accordance with the processing to be executed. For example, when the normal image output processing is performed, the capacitance addition circuit 14 outputs straight each pixel signal output from the horizontal scanning circuit 13 to the AD conversion circuit 15 (bypass). In addition, when the CNN processing is performed, the capacitance addition circuit 14 adds (for example, weights and adds) each pixel signal output from the horizontal scanning circuit 13 on the basis of the convolution coefficient stored in the storage section 17, and outputs the result to the AD conversion circuit 15 (details will be described later).

Here, the horizontal scanning circuit 13 and the capacitance addition circuit 14 function as a convolution circuit 20 that performs convolution processing on individual pixel signals output from the respective pixels 110. In normal CNN processing, an input image reaches a fully connected layer (FC layer) through a convolution layer and a pooling layer. In the convolution layer, a feature amount is extracted from the input image on the basis of the convolution coefficient (convolution filter). For example, the convolution filter is sequentially applied to the input image to extract the feature amount. The convolution circuit 20 executes processing related to the convolution layer (convolution processing) in an analog manner. The convolution circuit 20 is an analog circuit.

The AD conversion circuit 15 performs AD conversion processing on each pixel signal output from the capacitance addition circuit 14, that is, a pixel signal output from each pixel 110, and outputs each pixel signal, which is a digital signal, to the fully connected processing section 16. Various AD conversion circuits can be used as the AD conversion circuit 15.

The AD conversion circuit 15 includes a pooling circuit 150. Under the control of the control section 18, the pooling circuit 150 performs pooling processing on a pixel signal output from each pixel 110 in accordance with the processing to be executed. For example, when the normal image output processing is performed, the pooling circuit 150 outputs straight each pixel signal to the fully connected processing section 16 (bypass). In addition, when the CNN processing is performed, the AD conversion circuit 15 performs the pooling processing on each pixel signal, and outputs each pixel signal that has been subjected to the pooling processing to the fully connected processing section 16. The pooling circuit 150 performs the pooling processing on each pixel signal that has been subjected to the convolution processing (details will be described later).

Here, in the normal CNN processing, in the pooling layer, a maximum value or an average value is extracted in a predetermined number (for example, 3×3) of windows. A feature amount is extracted from the input image. In the case, a data amount is reduced. The pooling circuit 150 executes processing related to the pooling layer (convolution processing) in an analog manner. The pooling circuit 150 and the AD conversion circuit 15 are analog circuits.

Under the control of the control section 18, the fully connected processing section 16 outputs each pixel signal, which is a digital signal output from the AD conversion circuit 15, to the outside of an element (sensor) in accordance with the processing to be executed. For example, when the normal image output processing is performed, the fully connected processing section 16 outputs straight each pixel signal to the outside of the element (bypass). In addition, when the CNN processing is performed, the fully connected processing section 16 performs fully connected processing on each pixel signal, and outputs each pixel signal that has been subjected to the fully connected processing to the outside of the element.

Here, in the normal CNN processing, outputs from the pooling layer are collected in the fully connected layer. The fully connected processing section 16 logically executes the processing related to the fully connected layer (fully connected processing). The fully connected processing section 16 is, for example, a digital circuit (logic circuit).

Incidentally, the pixel signal output from the fully connected processing section 16 is input to, for example, an external device such as a signal processing section. For example, the external device generates a pixel signal of a digital signal, that is, pixel data, performs various kinds of processing on the pixel data, and finally generates the image data.

The storage section 17 stores various kinds of data such as a convolution coefficient (convolution filter). For example, a random access memory (RAM) and a flash memory are used as the storage section 17. The convolution coefficient read from the storage section 17 is temporarily set in a register 17*a*.

The control section 18 controls each section such as the vertical scanning circuit 12, the horizontal scanning circuit 13, the capacitance addition circuit 14, the pooling circuit 150, and the fully connected processing section 16. For example, the control section 18 controls the horizontal scanning circuit 13, the capacitance addition circuit 14, and the like on the basis of a convolution coefficient set in a register 18*a*. For example, a processor such as a central processing unit (CPU) is used as the control section 18. The CPU includes a read only memory (ROM), a RAM, and the like. The CPU controls operations of each circuit and each section by using the RAM as a work memory in accordance with a program preliminarily stored in the ROM.

<1-2. Example of Schematic Configuration of Pixel>

Figure 2:
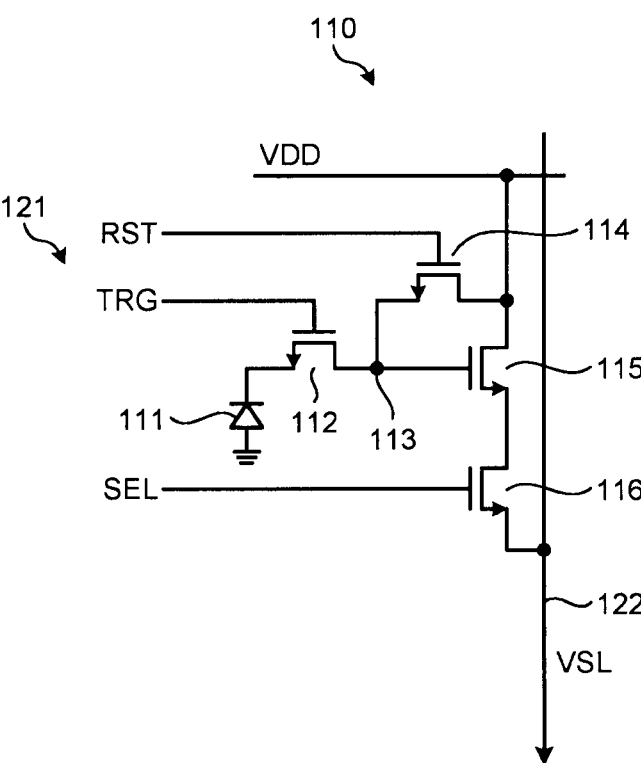
FIG. 2 is a circuit diagram depicting an example of a schematic configuration of a pixel according to the first embodiment.

FIG. 2 depicts an example of a schematic configuration of the pixel 110 according to the first embodiment. As depicted in FIG. 2, the pixel 110 includes a photoelectric conversion element 111, a trigger transistor 112, a reset transistor 114, an amplification transistor 115, and a selection transistor 116. For example, a PN-junction photodiode is used as the photoelectric conversion element 111. In addition, for example, an N-type metal oxide semiconductor (MOS) transistor is used as the trigger transistor 112, the reset transistor 114, the amplification transistor 115, and the selection transistor 116.

The pixel signal line 121 is connected to such a pixel 110. The pixel signal line 121 supplies a reset pulse RST, a transfer pulse TRG, and a selection signal SEL to the pixel 110. Therefore, the pixel signal line 121 includes a plurality of signal lines.

The photoelectric conversion element 111 photoelectrically converts incident light into charges (electrons here) in an amount corresponding to an amount of light. A cathode of the photoelectric conversion element 111 is connected to ground. An anode of the photoelectric conversion element 111 is connected to a drain of the trigger transistor 112.

A source of the trigger transistor 112 is connected to a floating diffusion layer 113. The transfer pulse TRG is supplied to a gate of the trigger transistor 112. The trigger transistor 112 is turned on (closed) when the transfer pulse TRG is in a high state, and is turned off (opened) when the transfer pulse TRG is in a low state. Charges output from the photoelectric conversion element 111 are supplied to the floating diffusion layer 113 with the trigger transistor 112 being in an on state. The floating diffusion layer 113 accumulates the charges supplied from the photoelectric conversion element 111. The floating diffusion layer 113 generates a voltage in accordance with an amount of the accumulated charges.

A source of the reset transistor 114 is connected to the floating diffusion layer 113. A power supply VDD for the pixel 110 is connected to a drain of the reset transistor 114. The reset pulse RST is supplied to a gate of the reset transistor 114. The reset transistor 114 is turned on when the reset pulse RST is in a high state, and is turned off when the reset pulse RST is in a low state.

A gate of the amplification transistor 115 is connected to the floating diffusion layer 113. The power supply VDD is connected to a drain of the amplification transistor 115. A drain of the selection transistor 116 is connected to a source of the amplification transistor 115. A source of the selection transistor 116 is connected to a vertical signal line (VSL) 122. The selection signal SEL is supplied to a gate of the selection transistor 116. The selection transistor 116 is turned on when the selection signal SEL is in the high state, and is turned off when the selection signal SEL is in the low state.

In such configuration, in an initial state, each of the selection signal SEL, the reset pulse RST, and the transfer pulse TRG is in the low state. In addition, the photoelectric conversion element 111 is exposed, and the trigger transistor 112 is turned off by the transfer pulse TRG in the low state. Therefore, charges generated by the exposure are accumulated in the photoelectric conversion element 111.

When the selection signal SEL is set to the high state, the selection transistor 116 is turned on. The reset pulse RST is set to the high state, and the charges of the floating diffusion layer 113 are discharged to the power supply VDD. This causes the potential of the floating diffusion layer 113 to be reset to a predetermined potential. After a predetermined time has elapsed since the reset pulse RST was returned to the low state, the transfer pulse TRG is set to the high state. Charges accumulated in the photoelectric conversion element 111 by exposure are supplied to and accumulated in the floating diffusion layer 113. A voltage corresponding to the charges accumulated in the floating diffusion layer 113 is generated. The voltage is amplified by the amplification transistor 115, and output to the vertical signal line 122 as a pixel signal via the selection transistor 116.

<1-3. CNN Operation Example and Normal Image Output Operation Example of Imaging Element>

FIG. 3 is a block diagram depicting a flow of CNN operation of the imaging element 10 according to the first embodiment. In the CNN operation, as depicted in FIG. 3, the imaging section 11 acquires each pixel signal (analog signal). The horizontal scanning circuit 13 and the capacitance addition circuit 14 (convolution circuit 20) perform the convolution processing on each pixel signal on the basis of the convolution coefficient (convolution filter). The pooling circuit 150 in the AD conversion circuit 15 executes the pooling processing on each pixel signal that has been subjected to the convolution processing. The fully connected processing section 16 executes the fully connected processing on each pixel signal that has been subjected to the pooling processing. Each pixel signal (pixel signal and classification label) that has been subjected to the CNN processing is output. The imaging element 10 can complete the CNN processing in the sensor. Incidentally, there is a plurality of types of convolution filters, and a feature amount to be extracted changes depending on a convolution filter to be applied.

Figure 4:
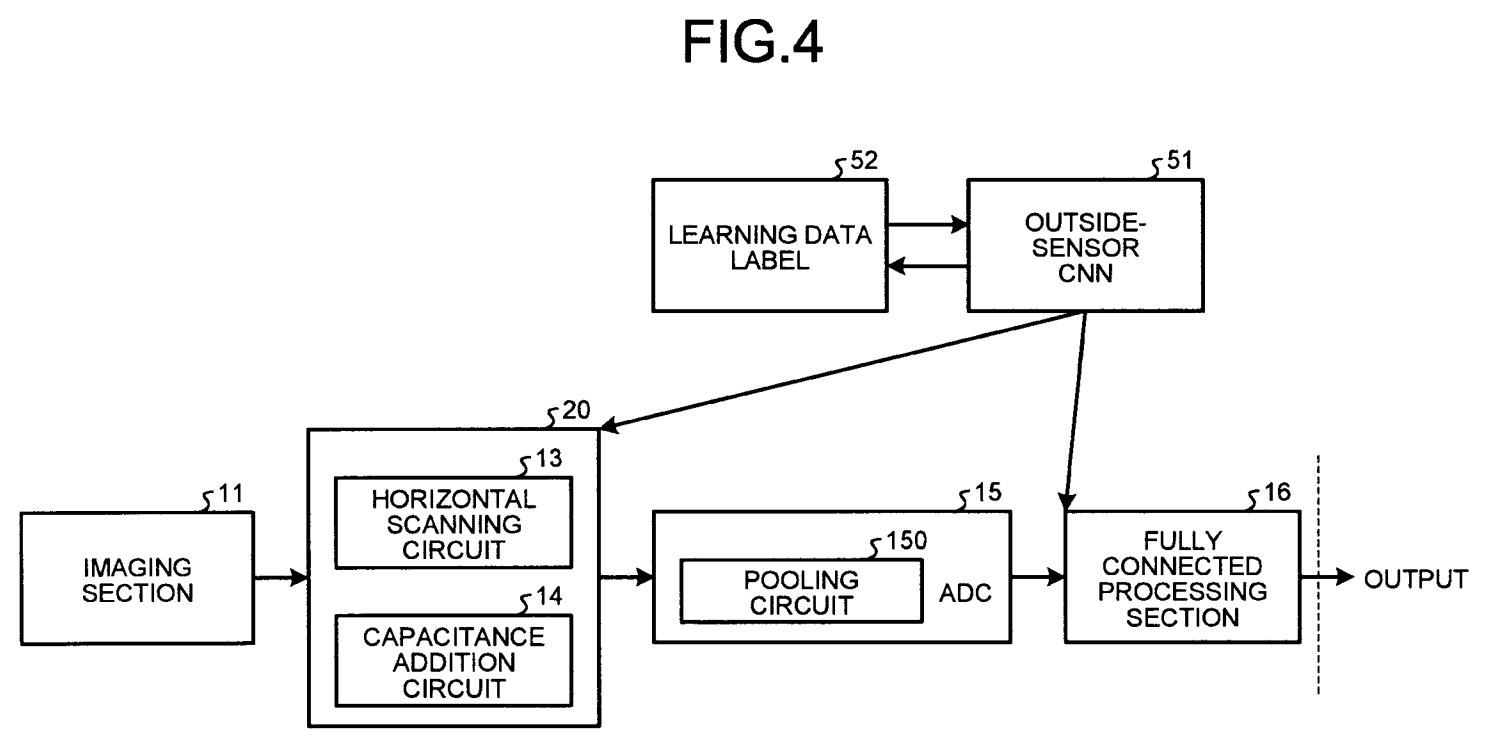

Here, FIG. 4 is a block diagram depicting a flow of CNN learning related to the CNN operation in FIG. 3. In order to achieve the CNN operation in FIG. 3, as depicted in FIG. 4, an outside-sensor CNN 51, which is a system outside the sensor, preliminarily learns a CNN, and the storage section 17 preliminarily stores the convolution coefficient and a fully connected processing coefficient. The outside-sensor CNN 51 can learn the CNN (convolution layer to pooling layer to fully connected layer) on the basis of learning data and a label 52, and acquire the convolution coefficient and the fully connected processing coefficient. The convolution circuit 20 performs convolution processing on the basis of the convolution coefficient stored in the storage section 17. In addition, the fully connected processing section 16 performs the fully connected processing on the basis of the fully connected processing coefficient stored in the storage section 17. In the examples of FIGS. 3 and 4, the convolution processing, the pooling processing, and the fully connected processing are executed in the sensor. Incidentally, the outside-sensor CNN 51 may include both or any one of hardware and software.

Figure 5:
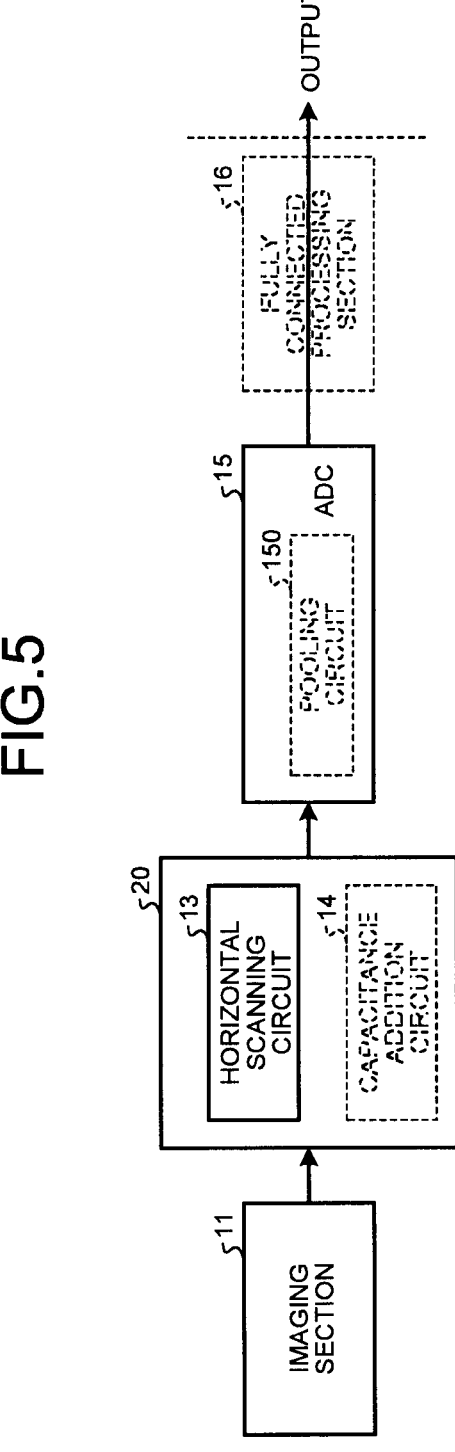
FIG. 5 is a block diagram depicting a flow of a normal image output operation of the imaging element according to the first embodiment.

FIG. 5 is a block diagram depicting a flow of a normal image output operation of the imaging element 10 according to the first embodiment. In the normal image output operation, as depicted in FIG. 5, the imaging section 11, the horizontal scanning circuit 13, and the AD conversion circuit 15 (excluding pooling circuit 150) operate to output a normal image (to output all pixels). All pieces of the CNN-based processing are bypassed. The capacitance addition circuit 14, the pooling circuit 150, and the fully connected processing section 16 do not operate. This causes a normal image that has not been subjected to the CNN processing to be output.

Incidentally, although, in the examples of FIGS. 3 and 4, the fully connected processing section 16 is provided in the sensor (imaging element 10), this is not a limitation. FIG. 6 is a block diagram depicting a flow of a variation of the CNN operation of the imaging element 10 according to the first embodiment. As depicted in FIG. 6, instead of the fully connected processing section 16, an outside-sensor CNN 50 that performs the fully connected processing may be provided outside the sensor. That is, the fully connected processing may be performed outside the sensor.

Figure 7:
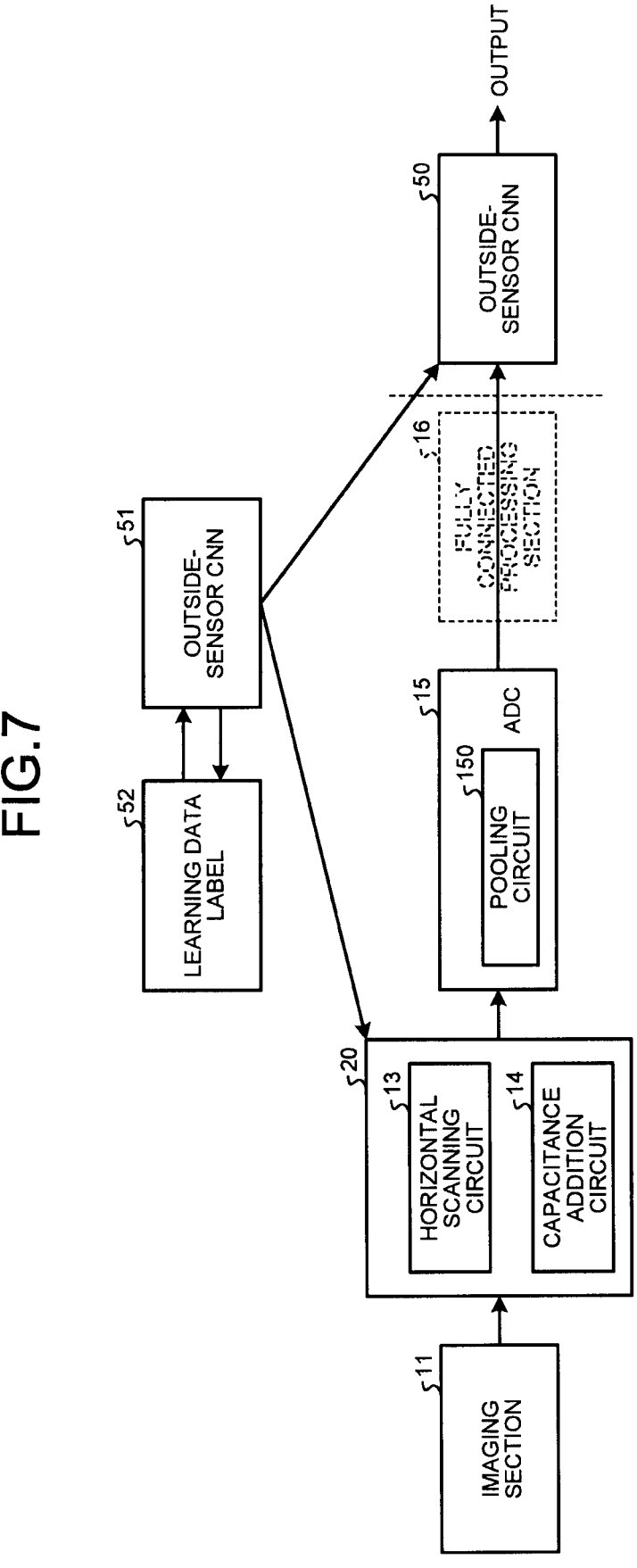
FIG. 7 is a block diagram depicting a flow of the CNN learning related to the CNN operation in FIG. 6.

Here, FIG. 7 is a block diagram depicting a flow of the CNN learning related to the CNN operation in FIG. 6. In order to achieve the CNN operation in FIG. 6, as depicted in FIG. 7, an outside-sensor CNN 51, which is a system outside the sensor, preliminarily learns a CNN, and the storage section 17 preliminarily stores the convolution coefficient (first layer). Then, the outside-sensor CNN 50 executes the CNN processing in the first and subsequent layers. In this case, convolution processing in the first layer is executed in the sensor, and subsequent pieces of processing is executed outside the sensor.

Incidentally, the CNN operation and the normal image output operation may be switched by a user, for example.

The user operates an input section (for example, switch and button) to cause the control section 18 to switch the CNN operation and the normal image output operation. The input section is electrically connected to the control section 18. The input section receives an input operation from the user, and transmits an input signal (switching instruction signal) to the control section 18 in response to the input operation. The control section 18 switches the CNN operation and the normal image output operation in response to the input signal.

For example, the control section 18 switches an operation mode from the CNN operation to the normal image output operation in response to an input signal for restricting the CNN operation, and restricts (prohibits) the convolution processing and the pooling processing. In contrast, the control section 18 switches the operation mode from the normal image output operation to the CNN operation in response to an input signal for permitting the CNN operation, and permits the convolution processing and the pooling processing. This allows the user to be given a selection right to select whether or not to execute the CNN operation, and can improve convenience for the user.

<1-4. Example of Schematic Configuration of Convolution Circuit>

Figure 8:
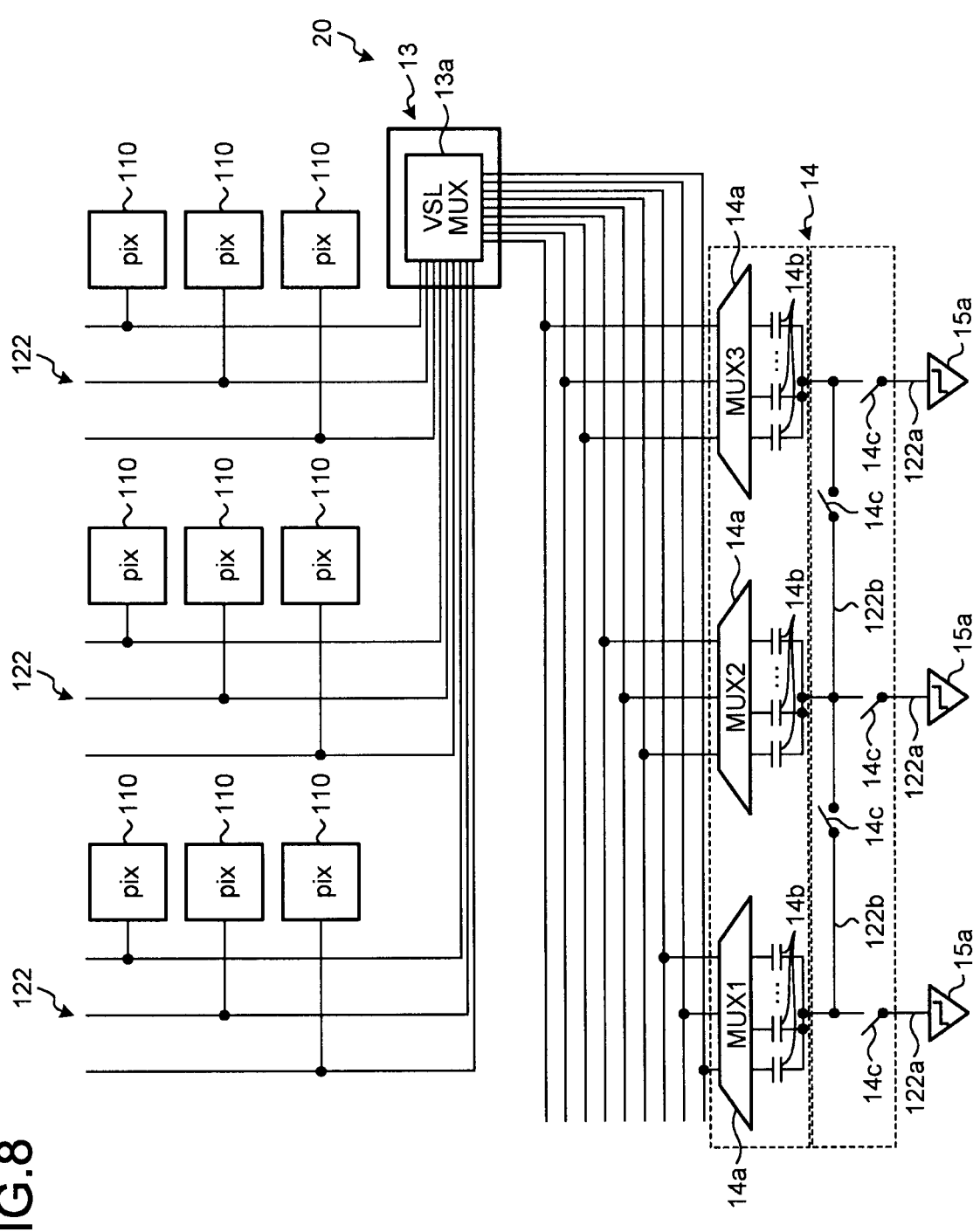
FIG. 8 depicts an example of a schematic configuration of a convolution circuit based on a convolution filter according to the first embodiment.

FIG. 8 depicts an example of a schematic configuration of the convolution circuit 20 based on the convolution filter according to the first embodiment. As depicted in FIG. 8, the horizontal scanning circuit 13 includes a multiplexer 13a. Each vertical signal line 122 of each column is connected to the multiplexer 13a. The multiplexer 13a selects, by switching (VSL connection/disconnection switch), a column to which each vertical signal line 122 is to be connected. The control section 18 controls the multiplexer 13a.

The capacitance addition circuit 14 includes a plurality of multiplexers 14a, a plurality of capacitors 14b, and a plurality of switches 14c. Each multiplexer 14a is connected to the multiplexer 13a of the horizontal scanning circuit 13 via a predetermined number (three in FIG. 8) of vertical signal lines 122. Each capacitor 14b is connected to a multiplexer 14a at one end. Each capacitor 14b is connected to one signal line 122a at the other end for each multiplexer 14a. Each multiplexer 14a changes the connection of the capacitor 14b, and sets an addition ratio (addition capacitance setting). The control section 18 controls these multiplexers 14a.

A signal line 122a is provided for each multiplexer 14a. These signal lines 122a are connected to adjacent signal lines 122a via connection lines 122b. Each switch 14c is individually provided in each signal line 122a, and is individually provided in each connection line 122b. The control section 18 controls on/off of these switches 14c.

Figure 9:
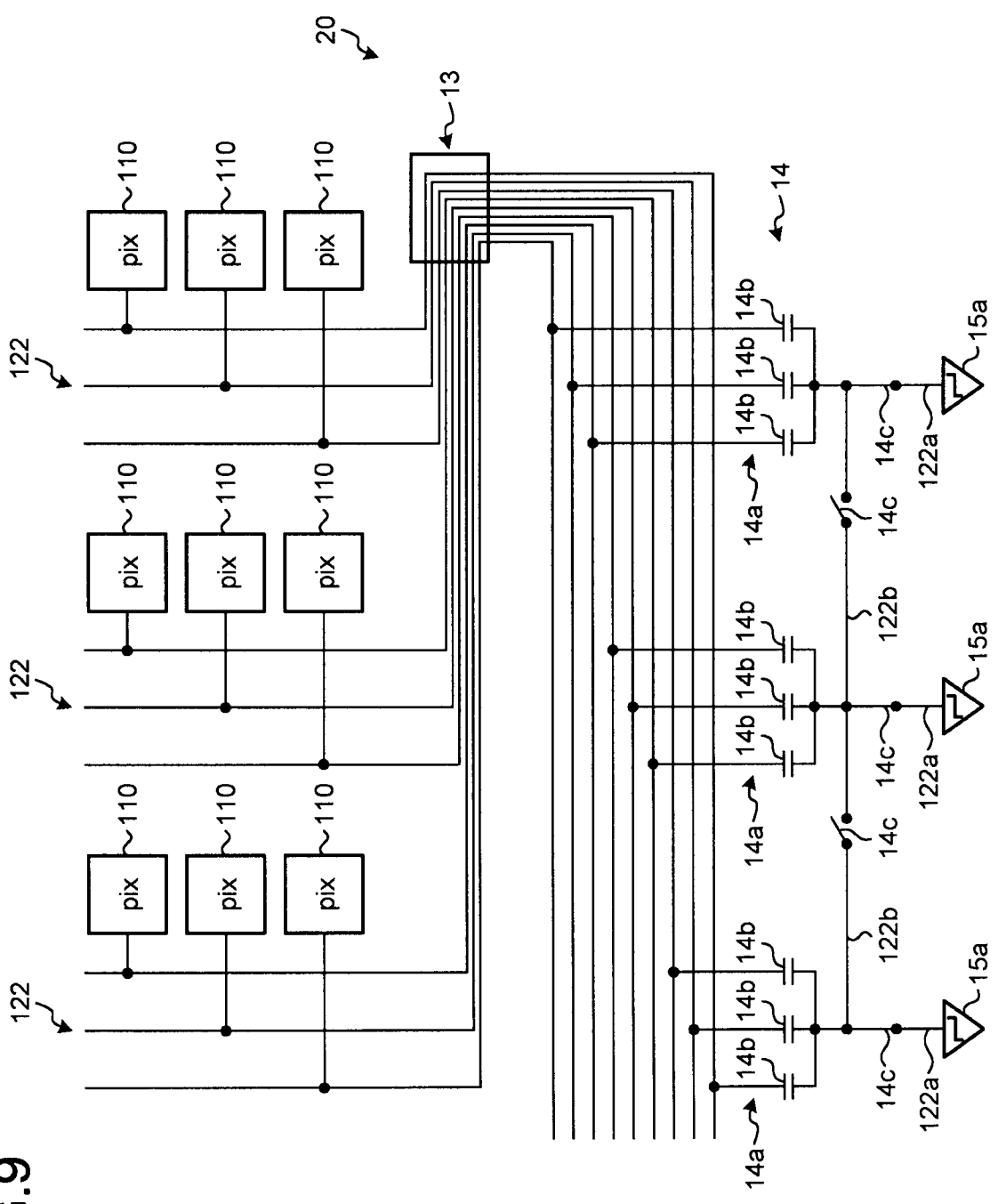
FIG. 9 depicts an example of operation of the convolution circuit at the time of performing the normal image output processing according to the first embodiment.

FIG. 9 depicts an example of operation of the convolution circuit 20 at the time of performing the normal image output processing according to the first embodiment. In the normal image output processing, as depicted in FIG. 9, the horizontal scanning circuit 13 connects all the vertical signal lines 122 to the capacitance addition circuit 14 without disconnection. In addition, the capacitance addition circuit 14 connects all the vertical signal lines 122 to the signal lines 122a via the multiplexers 14a and the capacitors 14b. In the case, switches 14c connect all the signal lines 122a without connecting the connection lines 122b.

Figure 10:
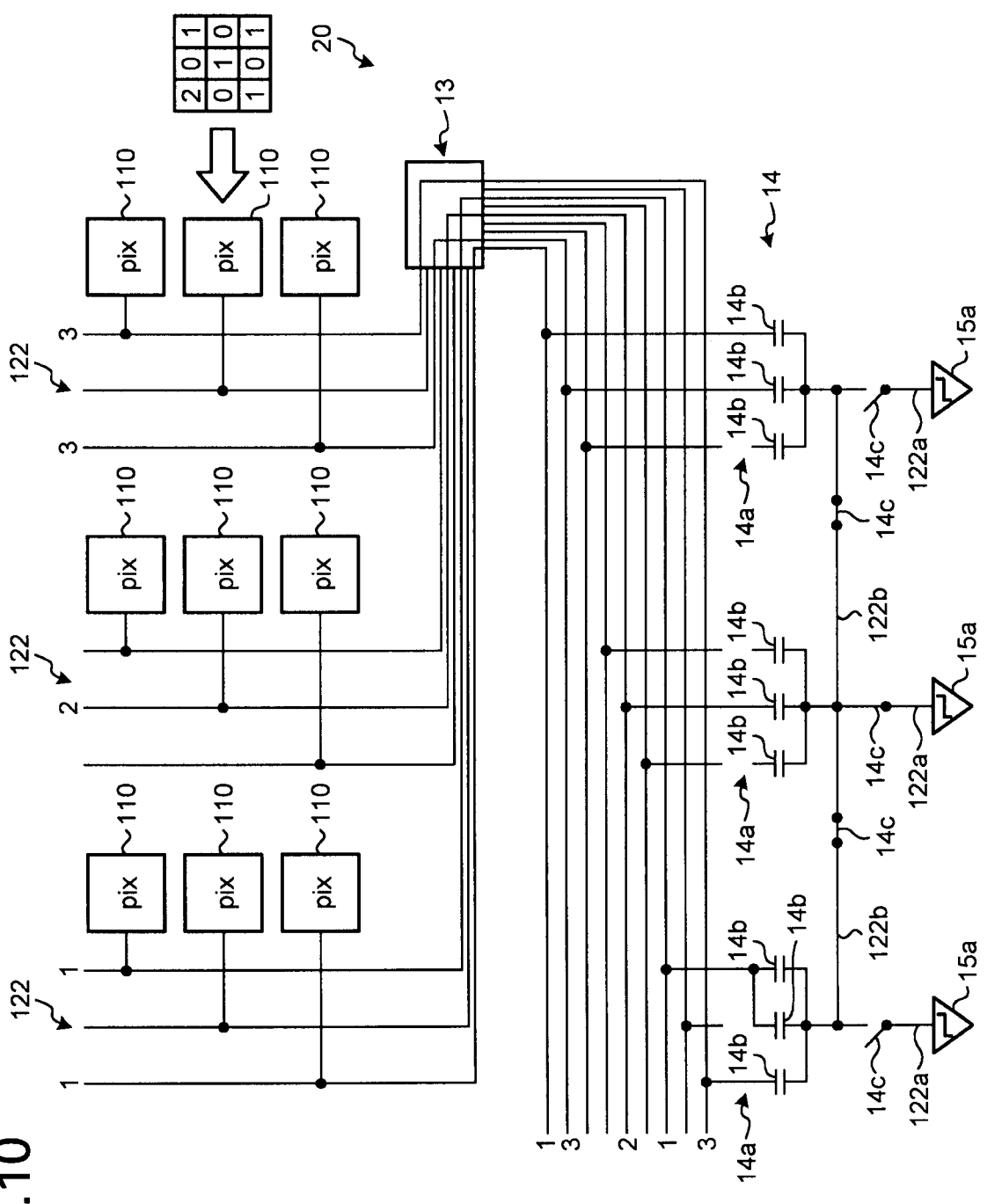
FIG. 10 depicts an example of operation of the convolution circuit at the time of performing the convolution processing according to the first embodiment.

FIG. 10 depicts an example of operation of the convolution circuit 20 at the time of performing the convolution processing according to the first embodiment. In the convolution processing, as depicted in FIG. 10, the horizontal scanning circuit 13 controls the connection between each vertical signal line 122 and the capacitance addition circuit 14 with the multiplexer 13a on the basis of the convolution filter. In addition, the capacitance addition circuit 14 controls the connection between each vertical signal line 122 and each signal line 122a with each multiplexer 14a and each capacitor 14b on the basis of the convolution filter. In the case, adjacent three signal lines 122a are defined as one set. Each switch 14c connects (laterally connects) the connection lines 122b for each set, and connects a central one signal line 122a. Incidentally, similar connection processing is performed in each pixel 110 other than each pixel 110 in FIG. 10.

In the example of FIG. 10, in a 3×3 convolution filter, "first row: 2, 0, and 1, second row: 0, 1, and 0, and third row: 1, 0, and 1" is established. The horizontal scanning circuit 13 and the capacitance addition circuit 14 achieve the convolution filter (number of matrices and each numerical value). The capacitance addition circuit 14 includes each multiplexer 14a and each capacitor 14b for setting the convolution coefficient. For example, in the 3×3 convolution filter in FIG. 10, two is provided in the first row and the first column. A pixel (upper left pixel) 110 in the first row and the first column in FIG. 10 is connected to two capacitors 14b via the vertical signal line 122. Similarly, zero is provided in the first row and the second column. The pixel 110 in the first row and the second column in FIG. 10 is not connected to the capacitor 14b. One is provided in the first row and the third column. The pixel 110 in the first row and the third column in FIG. 10 is connected to one capacitor 14b. In the second and third rows, connection/disconnection between the pixel 110 and the capacitor 14b is similarly performed.

Here, like the convolution filter depicted in FIG. 10, a convolution filter including 0 (0 filter) can be achieved by the horizontal scanning circuit 13 and the capacitance addition circuit 14. This allows achievement of the 0 filter with simple configuration. Incidentally, a larger number of capacitors 14b of the capacitance addition circuit 14 increase the degree of freedom of the convolution coefficient (convolution filter).

<1-5. Example of Schematic Configuration of AD Conversion Circuit Including Pooling Circuit>

Figure 11:
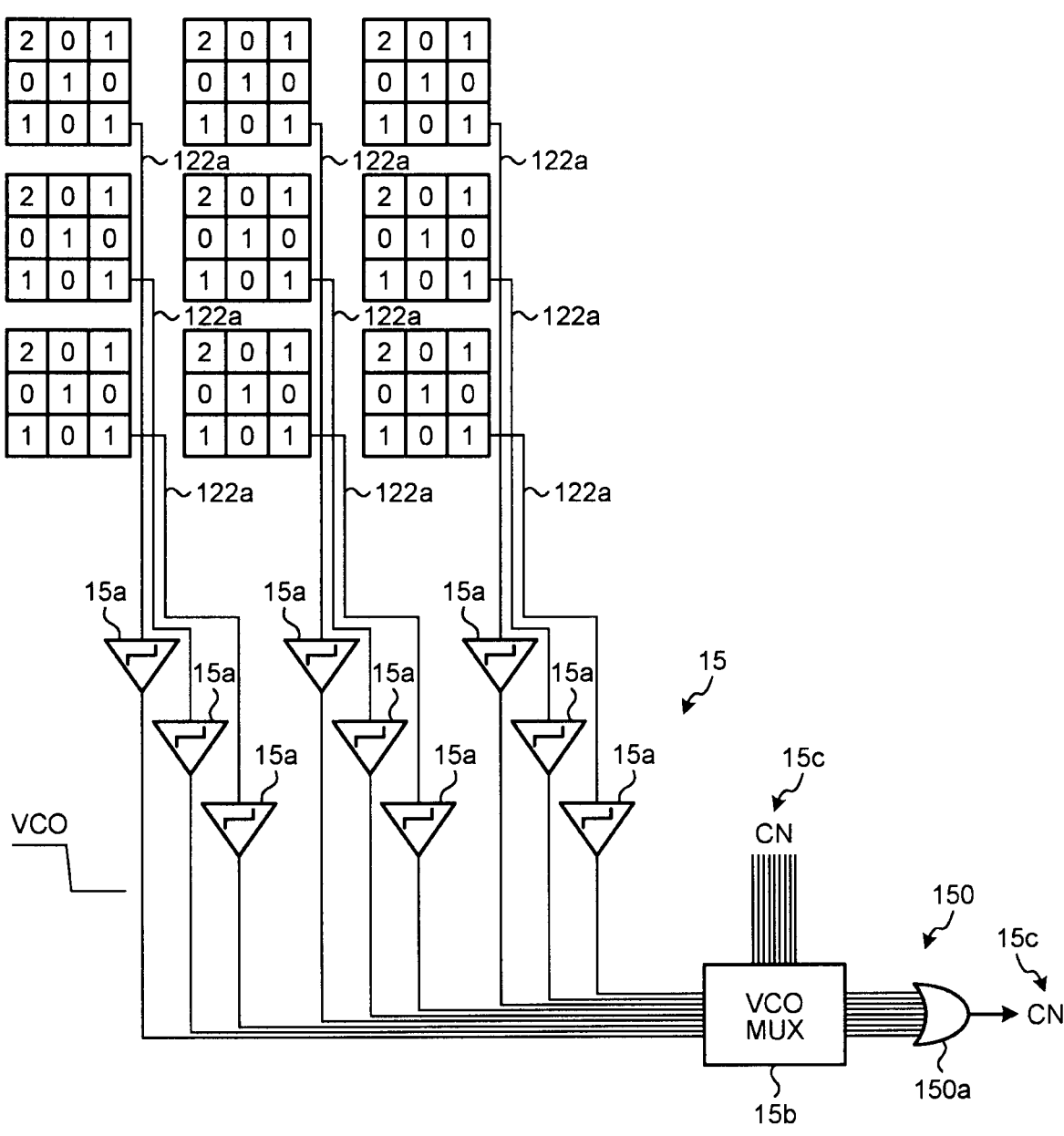
FIG. 11 depicts an example of a schematic configuration of an AD conversion circuit including a pooling circuit according to the first embodiment.

FIG. 11 depicts an example of a schematic configuration of the AD conversion circuit 15 including the pooling circuit 150 according to the first embodiment. As depicted in FIG. 11, the AD conversion circuit 15 includes a plurality of comparators 15a, a multiplexer 15b, and a plurality of counters 15c (CN). For example, an AD conversion circuit using a voltage controlled oscillator (VCO) is used as the AD conversion circuit 15. Each comparator 15a is provided in each signal line 122a. The multiplexer 15b is connected to each signal line 122a. Each counter 15c is connected to a subsequent stage (downstream side of signal flow) of the multiplexer 15b.

The pooling circuit 150 includes an OR circuit 150a. The OR circuit 150a is provided between the multiplexer 15b and the counter 15c. The pooling circuit 150 performs maximum value pooling processing (max pooling processing) on pixel signals output from the comparators 15a by using the OR circuit 150a. Note, however, that the pooling processing is not limited to the maximum value pooling processing. For example, average value pooling processing may be used.

When the normal image output processing is performed, the multiplexer 15b sends straight the pixel signal output from the comparators 15a to the counter 15c (CN). In addition, when the CNN processing is performed, the multiplexer 15b sends the pixel signals output from the comparators 15a to the OR circuit 150a. The OR circuit 150a performs the maximum value pooling processing on each pixel signal, and sends each image signal that has been subjected to the pooling processing to the counters 15c (CN). Each pixel signal output from the counter 15c is a digital signal. The control section 18 controls the multiplexer 15b.

<1-6. Actions/Effects>

As described above, according to the first embodiment, an operation related to the convolution processing and the pooling processing can be processed in an analog manner by incorporating the convolution processing and the pooling processing of the CNN processing in the imaging element 10, and a processing time can be speeded up. For example, the scales of a memory, a logic circuit, and the like can be reduced by achieving the convolution processing and the pooling processing in an analog circuit. In addition, a load of logic processing can be reduced, and a lead time can be shortened. Thus, an image recognition system can be simplified, and a lead time can be shortened.

2. SECOND EMBODIMENT

Figure 12:
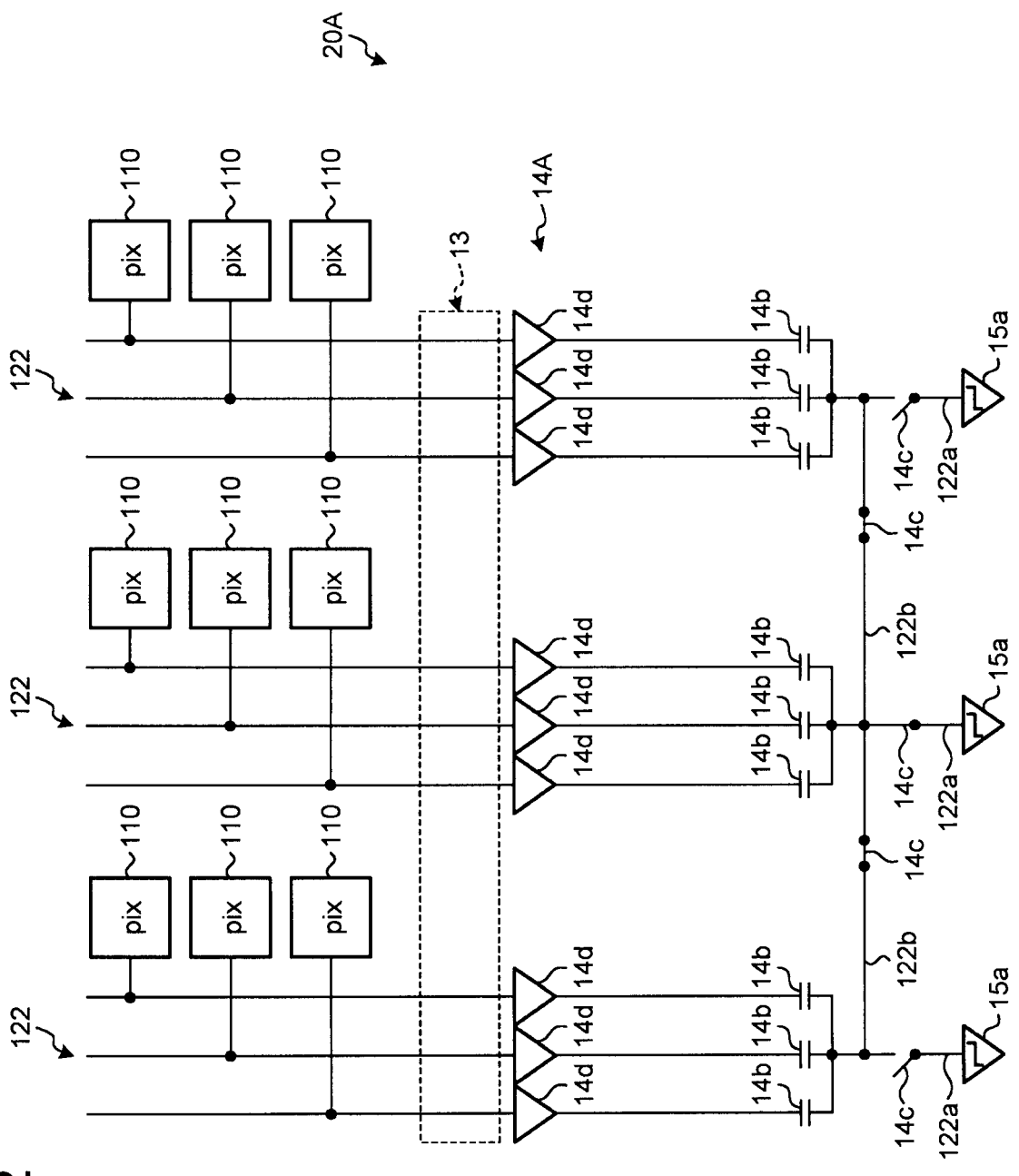
FIG. 12 depicts an example of a schematic configuration of the convolution circuit based on the convolution filter according to the second embodiment.

Next, a convolution circuit 20A according to a second embodiment will be described with reference to FIG. 12. FIG. 12 depicts an example of a schematic configuration of the convolution circuit 20A based on the convolution filter according to the second embodiment. Differences from the first embodiment will be mainly described below, and other descriptions will be omitted.

As depicted in FIG. 12, the convolution circuit 20A according to the second embodiment includes a capacitance addition circuit (addition circuit) 14A partially different from that of the first embodiment. The capacitance addition circuit 14A includes a plurality of amplifiers (column amplifiers) 14d for setting a convolution coefficient in addition to the plurality of capacitors 14b and the plurality of switches 14c according to the first embodiment. These amplifiers 14d are provided for each vertical signal line 122. A gain of an amplifier 14d is changed to achieve a convolution filter. For example, when a convolution filter has a numerical value of two, the gain of the amplifier 14d is doubled. Such an amplifier 14d is used to achieve a convolution filter. Incidentally, although the capacitance ratio of the capacitor 14b is fixed, element configuration can be simplified as compared with that in a case of addition by the capacitance ratio.

As described above, according to the second embodiment, the configuration of the imaging element 10 can be simplified by using the plurality of amplifiers 14d as a part of the capacitance addition circuit 14A of the convolution circuit 20A, so that an image recognition system can be simplified. Incidentally, according to the second embodiment, the same effects as those of the first embodiment can be obtained.

3. THIRD EMBODIMENT

Next, convolution processing (including slide processing) according to a third embodiment will be described with reference to FIGS. 13A, 13B, 14, and 15. Differences from the first embodiment will be mainly described below, and other descriptions will be omitted.

FIGS. 13A and 13B depict slides of a convolution filter according to the third embodiment. As depicted in FIGS. 13A and 13B, in the third embodiment, the convolution filter is horizontally shifted in a predetermined movement amount. In the example of FIGS. 13A and 13B, the predetermined movement amount (stride) is one, and the convolution filter is slid from FIG. 13A to 13B with movement amount=1. Incidentally, the slide means shifting the convolution filter, and the stride is a unit indicating a movement amount in which the convolution filter is shifted.

Figure 14:
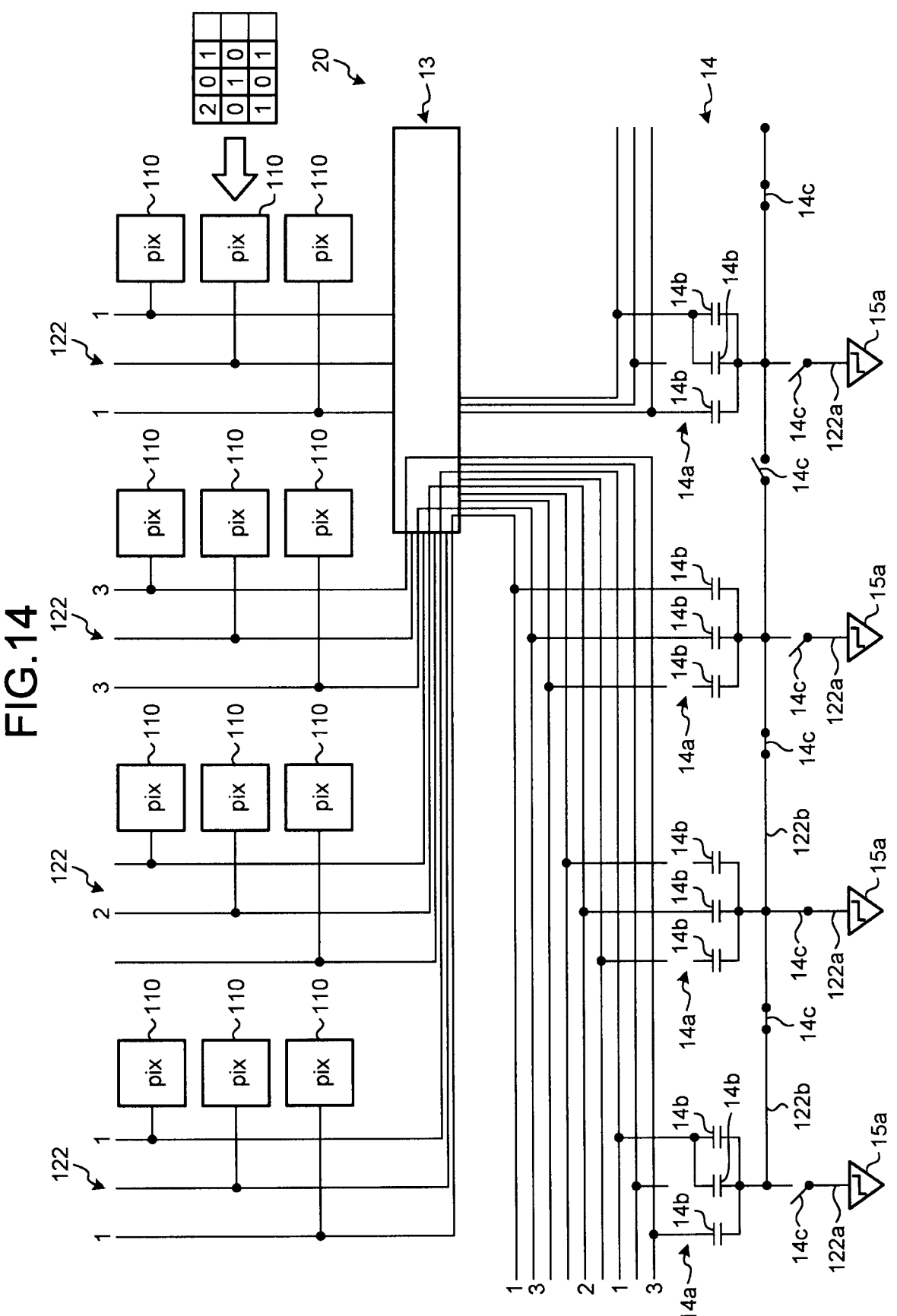
FIG. 14 is a first diagram depicting an example of the operation of the convolution circuit at the time of performing the convolution processing according to the third embodiment.
Figure 15:
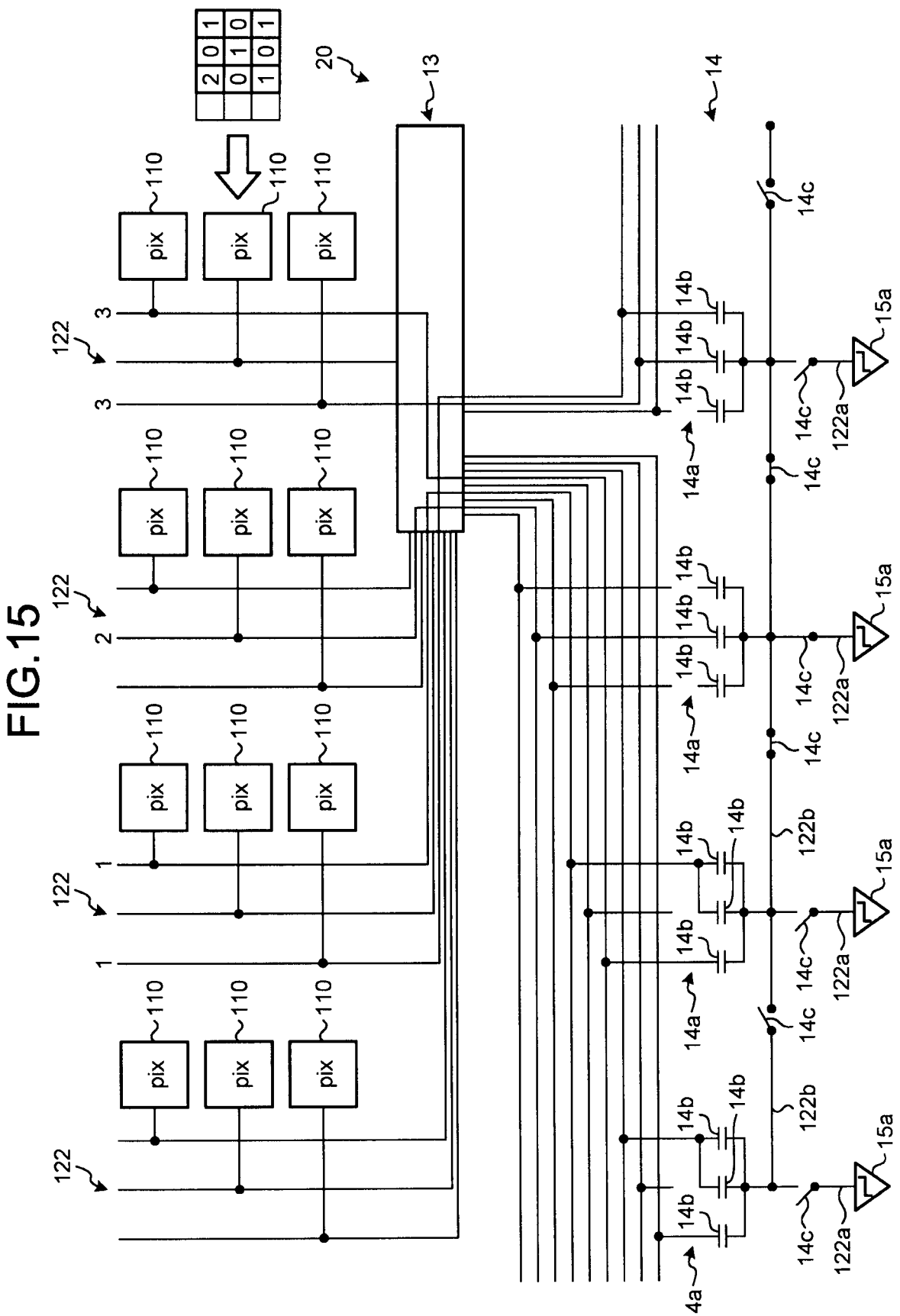
FIG. 15 is a second diagram depicting an example of the operation of the convolution circuit at the time of performing the convolution processing according to the third embodiment.

FIG. 14 is a first diagram depicting an example of operation of the convolution circuit 20 at the time of performing the convolution processing according to the third embodiment. FIG. 15 is a second diagram depicting an example of the operation of the convolution circuit 20 at the time of performing the convolution processing according to the third embodiment. As depicted in FIGS. 14 and 15, the horizontal scanning circuit 13 and the capacitance addition circuit 14 according to the third embodiment have configurations similar to those of the first embodiment. In addition, the horizontal scanning circuit 13 and the capacitance addition circuit 14 can execute the convolution processing including the slide processing.

As depicted in FIG. 14, in the convolution processing, the horizontal scanning circuit 13 controls the connection between each vertical signal line 122 and the capacitance addition circuit 14 on the basis of the convolution filter. In addition, the capacitance addition circuit 14 controls the connection between each vertical signal line 122 and each signal line 122a with each multiplexer 14a and each capacitor 14b on the basis of the convolution filter. In the case, adjacent three signal lines 122a are defined as one set. Each switch 14c connects (laterally connects) the connection lines 122b for each set, and connects a central one signal line 122a. In the example of FIG. 14, in a 3×3 convolution filter, "first row: 2, 0, and 1, second row: 0, 1, and 0, and third row: 1, 0, and 1" is established. The horizontal scanning circuit 13 and the capacitance addition circuit 14 achieve the convolution filter (number of matrices and each numerical value).

As depicted in FIG. 15, when the convolution filter is shifted with movement amount=1 (see FIGS. 13A and 13B), the horizontal scanning circuit 13 controls the connection between each vertical signal line 122 and the capacitance addition circuit 14 on the basis of the convolution filter and the movement amount. In addition, the capacitance addition circuit 14 controls the connection between each vertical signal line 122 and each signal line 122a with each multiplexer 14a and each capacitor 14b on the basis of the convolution filter and the movement amount. In the case, a set in which three signal lines 122a are combined is shifted by one of the signal lines 122a. Each switch 14c connects (laterally connects) the connection lines 122b for each set, and connects a central one signal line 122a. This causes the convolution filter to slide in the horizontal direction (row direction). Such slide is repeated in the imaging section 11.

As described above, according to the third embodiment, the convolution processing including the slide processing can be performed, so that variations of the convolution processing can be increased, and convenience can be improved for a user. Incidentally, according to the third embodiment, the same effects as those of the first embodiment can be obtained.

Although, in the above-described third embodiment, a form, in which convolution is performed by not simultaneously but separately performing AD conversion when a convolution filter A and a convolution filter B are simultaneously subjected to AD conversion, is adopted since a column circuit needs to be added, this is not a limitation. For example, a column circuit such as a vertical column may be added to simultaneously perform the AD conversion in the convolution filter A and the convolution filter B.

In addition, although, in the above-described third embodiment, the convolution filter is shifted in the horizontal direction (row direction), this is not a limitation. For example, the convolution filter may be shifted in the vertical direction (column direction). Also in this case, the convolution filter can be vertically shifted by adding a column circuit such as a vertical column.

4. OTHER EMBODIMENTS

Incidentally, although, in each of the above-described embodiments, one convolution layer and one pooling layer are provided, and one piece of convolution processing and one piece of pooling processing are performed, this is not a limitation. For example, multiple convolution layers and multiple pooling layers may be provided, and a plurality of numbers of times of convolution processing and a plurality of numbers of times of pooling processing may be repeatedly performed.

In addition, the imaging element 10 according to each of the above-described embodiments may be formed on one chip. Alternatively, the imaging element 10 may be divided and formed on a plurality of chips. Further, the imaging element 10 may be formed as a laminated structure obtained by bonding these chips. For example, the imaging element 10 may have a structure in which a light receiving chip and a circuit chip are vertically laminated (two-layer laminated structure). The light receiving chip includes the imaging section 11. The circuit chip includes the storage section 17 and the control section 18.

5. APPLICATION EXAMPLE

Figure 16:
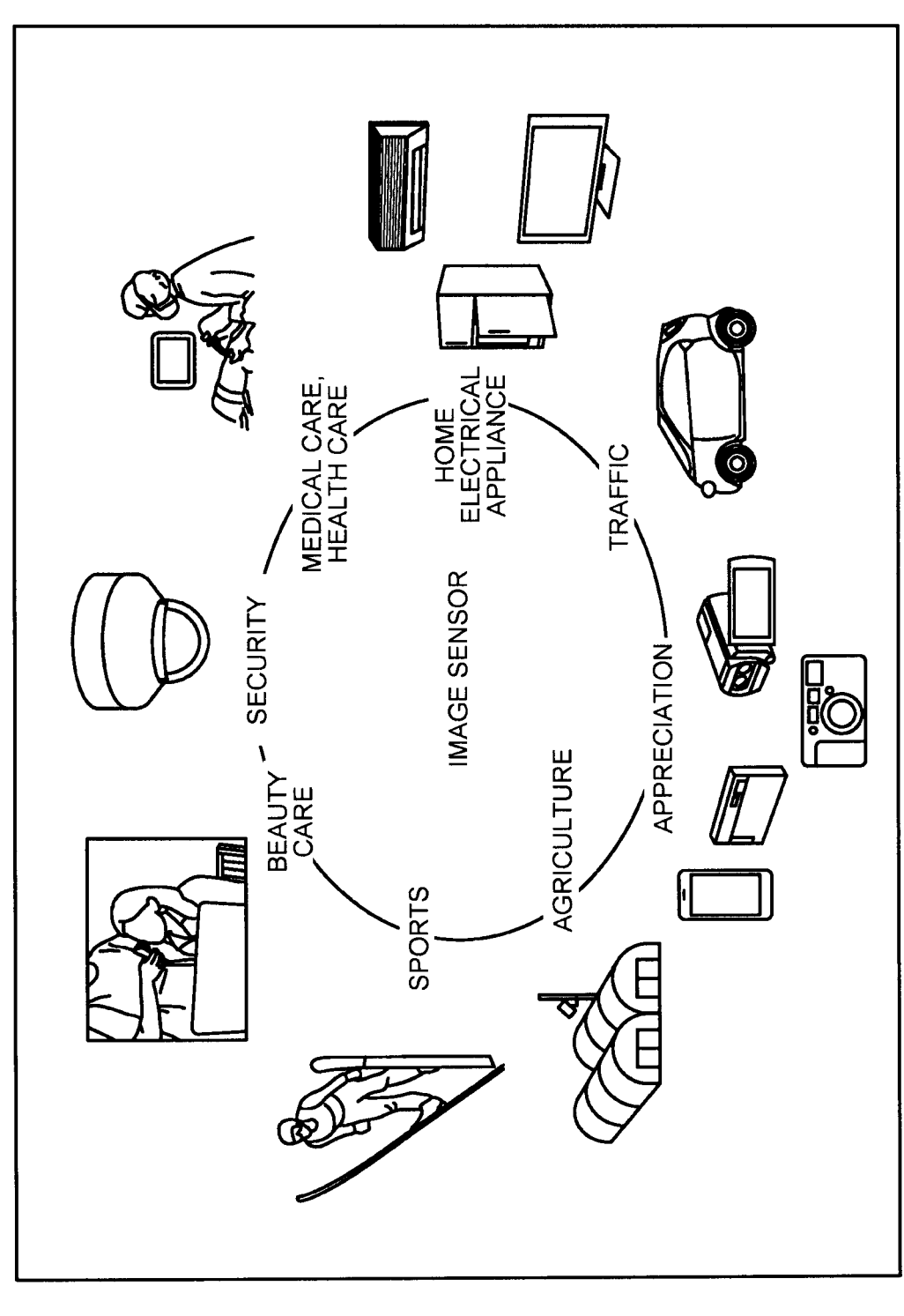
FIG. 16 depicts a usage example in which an imaging element according to each embodiment is used.

Next, an application example of the imaging element 10 according to each embodiment will be described. FIG. 16 depicts a usage example in which the imaging element 10 according to each embodiment is used.

For example, as described below, the above-described imaging element 10 can be used in various cases in which light such as visible light, infrared light, ultraviolet light, and X-rays are sensed. For example, as depicted in FIG. 16, the imaging element 10 is used for a "device that captures an image provided for appreciation, such as a digital camera and a portable device with a camera function", a "device provided for traffic, such as a vehicle-mounted sensor, a monitoring camera, and a distance measurement sensor, the vehicle-mounted sensor photographing, for example, the front, back, surroundings, and inside of an automobile for safe driving such as automatic stop, recognition of the state of a driver, and the like, the monitoring camera monitoring a traveling vehicle and a road, the distance measurement sensor measuring, for example, a distance between vehicles", a "device provided for a home electrical appliance, such as a TV, a refrigerator, and an air conditioner, for photographing a gesture of a user and operating a device according to the gesture", a "device provided for medical care or health care, such as an endoscope and a device that performs angiography by receiving infrared light", a "device provided for security, such as a monitoring camera for security and a camera for person authentication", a "device provided for beauty care, such as a skin measuring instrument that photographs skin and a microscope that photographs a scalp", a "device provided for sports, such as an action camera and a wearable camera for sports", a "device provided for agriculture, such as a camera for monitoring the states of fields and crops", and the like.

For example, the above-described imaging element 10 can be applied to various electronic devices, such as an imaging device including a digital still camera and a digital video camera, a mobile phone having an imaging function, and other devices having an imaging function.

Figure 17:
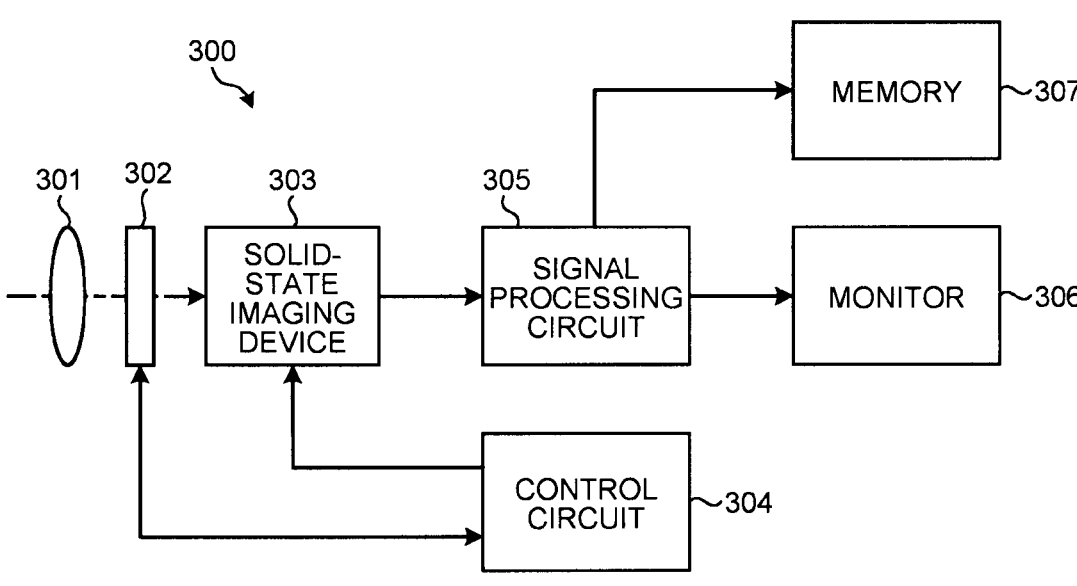
FIG. 17 depicts an example of a schematic configuration of an imaging device.

FIG. 17 is a block diagram depicting a configuration example of an imaging device 300 as an electronic device to which the technology according to the present disclosure can be applied. The imaging device 300 includes an optical system 301, a shutter device 302, a solid-state imaging device 303, a control circuit (control section) 304, a signal processing circuit 305, a monitor 306, and a memory 307. The imaging device 300 can capture a still image and a moving image.

The optical system 301 includes one or a plurality of lenses. The optical system 301 guides light (incident light) from a subject to the solid-state imaging device 303, and forms an image of the light on a light receiving surface of the solid-state imaging device 303.

The shutter device 302 is disposed between the optical system 301 and the solid-state imaging device 303. The shutter device 302 controls a light application period and a light shielding period for the solid-state imaging device 303 under the control of the control circuit 304.

The solid-state imaging device 303 includes, for example, a package including the above-described imaging element 10. The solid-state imaging device 303 accumulates signal charges for a certain period in accordance with light whose image is formed on the light receiving surface via the optical system 301 and the shutter device 302. The signal charges accumulated in the solid-state imaging device 303 are transferred in accordance with a drive signal (timing signal) supplied from the control circuit 304.

The control circuit 304 outputs a drive signal for controlling transfer operation of the solid-state imaging device 303 and shutter operation of the shutter device 302 to drive the solid-state imaging device 303 and the shutter device 302.

The signal processing circuit 305 performs various types of signal processing on the signal charges output from the solid-state imaging device 303. An image (image data) obtained by signal processing performed by the signal processing circuit 305 is supplied to be displayed on the monitor 306, or supplied to be stored (recorded) in the memory 307.

Also in the imaging device 300 configured as described above, an image recognition system can be simplified and a lead time can be shortened by applying the above-described imaging element 10 as the solid-state imaging device 303.

6. APPLICATIONS

In addition, the technology according to the present disclosure can be applied to various products. For example, the technology according to the present disclosure may be achieved as a device such as an electronic device mounted in any type of mobile body, such as an automobile, an electric vehicle, a hybrid electric vehicle, a motorcycle, a bicycle, a personal mobility, an airplane, a drone, a ship, a robot, a construction machine, and an agricultural machine (tractor). In addition, for example, the technology according to the present disclosure may be applied to an endoscopic surgical system, a microscopic surgical system, and the like.

Figure 18:
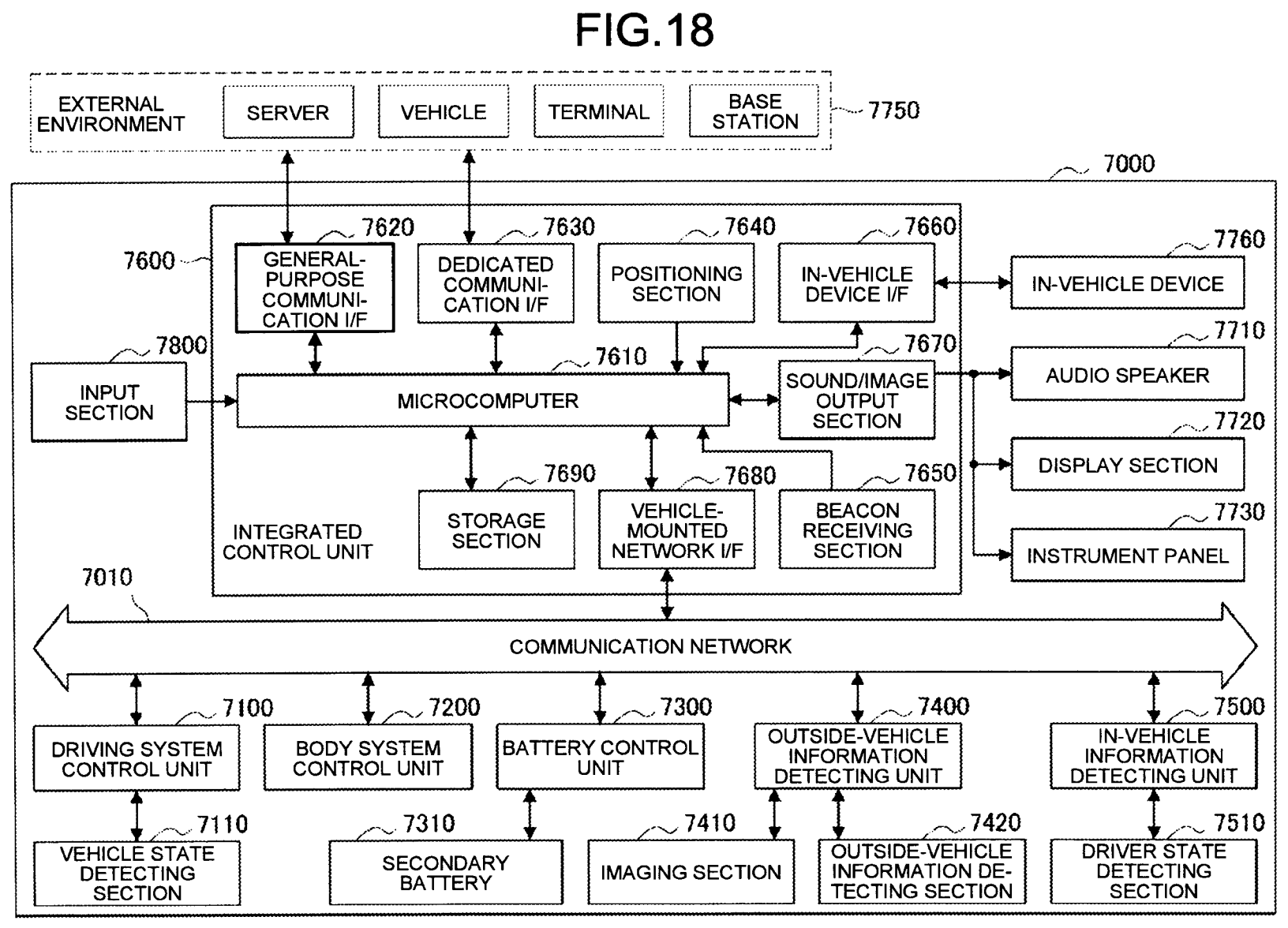

FIG. 18 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example in FIG. 18, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 18 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 19:
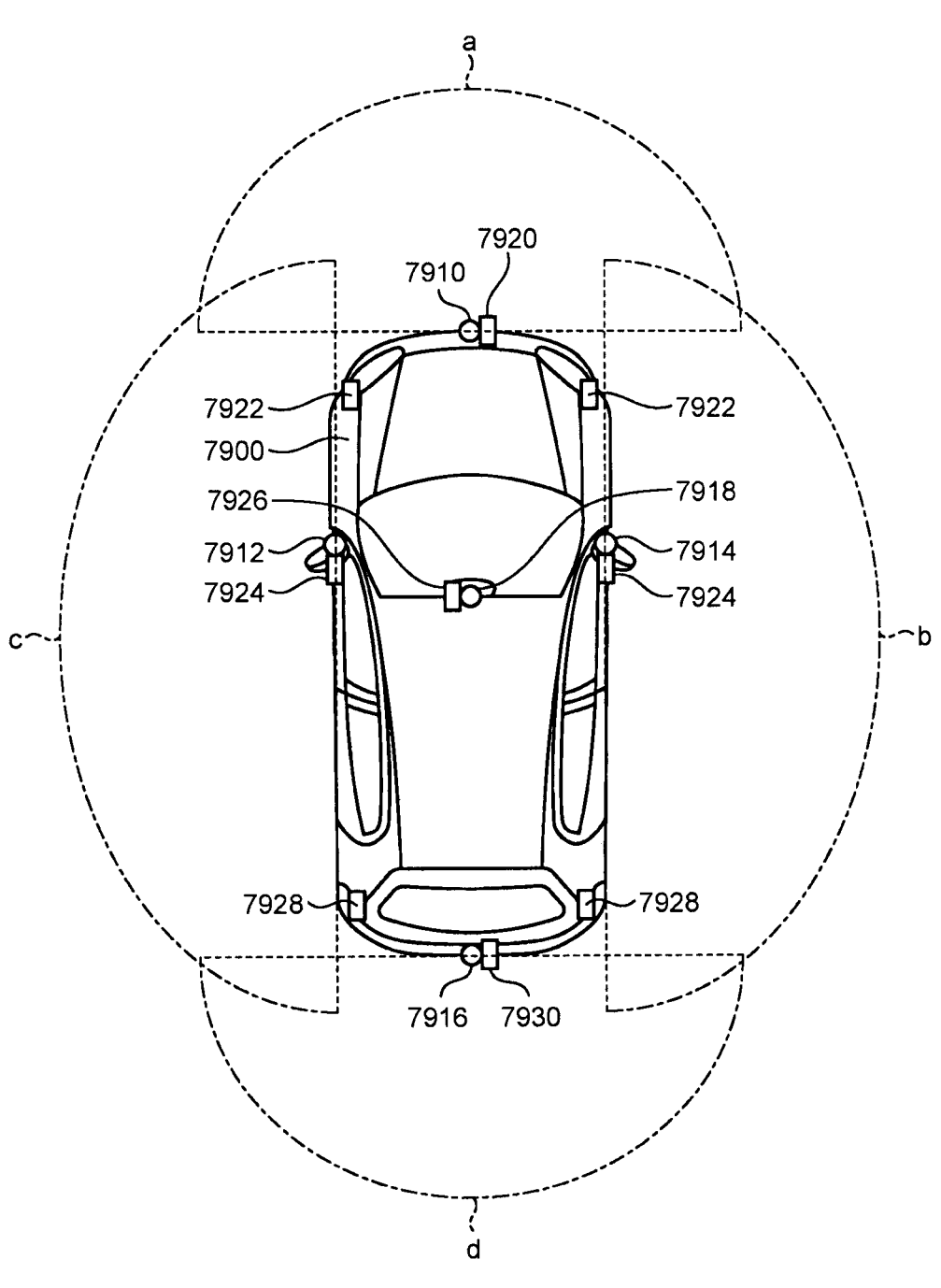
FIG. 19 is a diagram of assistance in explaining an example of installation positions of an outside-vehicle information detecting section and an imaging section.

Here, FIG. 19 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 19 depicts an example of photographing ranges of the respective imaging sections 7910, 7912, 7914, and 7916. An imaging range a represents the imaging range of the imaging section 7910 provided to the front nose.

Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 18, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automated driving, which makes the vehicle to travel automatedly without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 18, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 18 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

Incidentally, a computer program for implementing each function of the imaging element 10 according to the present embodiment described with reference to FIG. 1 can be implemented in any control unit or the like. In addition, a computer-readable recording medium storing such a computer program can be provided. The recording medium is, for example, a magnetic disk, an optical disk, a magneto-optical disk, and a flash memory. In addition, the above-described computer program may be distributed via, for example, a network without using a recording medium.

In the above-described vehicle control system 7000, the imaging element 10 according to the present embodiment described with reference to FIG. 1 can be applied to the integrated control unit 7600 of the application in FIG. 18. For example, the storage section 17 and the control section 18 of the imaging element 10 correspond to the microcomputer 7610, the storage section 7690, and the vehicle-mounted network I/F 7680 of the integrated control unit 7600. In the imaging device, an image recognition system can be simplified and a lead time can be shortened by applying the technology according to the present disclosure to the imaging device such as the imaging section 7410.

In addition, at least some components of the imaging element 10 according to the present embodiment described with reference to FIG. 1 may be implemented in a module (for example, integrated circuit module including one die) for the integrated control unit 7600 in FIG. 18. Alternatively, the imaging element 10 according to the present embodiment described with reference to FIG. 1 may be implemented by a plurality of control units of the vehicle control system 7000 in FIG. 18.

Although the embodiment of the present disclosure has been described above, the technical scope of the present disclosure is not limited to the above-described embodiment as it is, and various modifications can be made without departing from the gist of the present disclosure. In addition, components of different embodiments and variations may be appropriately combined.

In addition, the effects in each embodiment described in the specification are merely examples and not limitations. Other effects may be exhibited.

7. APPENDIX

Incidentally, the present technology can also have the configurations as follows.

(1)

An imaging element comprising:

an imaging section in which a plurality of pixels individually including a photoelectric conversion element is arranged in a matrix;

a convolution circuit that performs convolution processing on a plurality of pixel signals, which are analog signals each output from the plurality of pixels, on a basis of a convolution coefficient; and a pooling circuit that performs pooling processing on the plurality of pixel signals that has been subjected to the convolution processing.

(2)

The imaging element according to (1) above, further comprising a fully integrated processing section that performs fully integrated processing on the plurality of pixel signals that has been subjected to the pooling processing.

(3)

The imaging element according to (1) or (2) above, wherein the convolution circuit includes:

a horizontal scanning circuit that selects a plurality of pixels from which the pixel signals are output from the plurality of pixels on a basis of the convolution coefficient; and an addition circuit that adds the plurality of pixel signals each output from the plurality of pixels that has been selected, on a basis of the convolution coefficient.

(4)

The imaging element according to (3) above, wherein the addition circuit includes a multiplexer for setting the convolution coefficient and a plurality of capacitors.

(5)

The imaging element according to (3) above, wherein the addition circuit includes a plurality of amplifiers for setting the convolution coefficient.

(6)

The imaging element according to any one of (1) to (5) above, further comprising a storage section that stores the convolution coefficient.

(7)

The imaging element according to any one of (1) to (6) above, further comprising a control section that controls the convolution circuit and the pooling circuit on a basis of the convolution coefficient.

(8)

The imaging element according to (7) above, wherein the control section restricts or permits the convolution processing and the pooling processing in response to an input signal input to the control section.

(9)

The imaging element according to any one of (1) to (8) above, wherein the convolution coefficient is a convolution filter, and the convolution circuit shifts the convolution filter in a predetermined movement amount, and performs the convolution processing.

(10)

The imaging element according to any one of (1) to (9) above, wherein the convolution coefficient is a convolution filter including zero.

(11)

An imaging device comprising:

an imaging element; and an optical system that forms an image of light on a light receiving surface of the imaging element, wherein the imaging element includes:

an imaging section in which a plurality of pixels individually including a photoelectric conversion element is arranged in a matrix;

a convolution circuit that performs convolution processing on a plurality of pixel signals, which are analog signals each output from the plurality of pixels, on a basis of a convolution coefficient; and a pooling circuit that performs pooling processing on the plurality of pixel signals that has been subjected to the convolution processing.

(12)

An imaging device including:

an imaging element according to any one of (1) to (10) above; and an optical system that forms an image of light on a light receiving surface of the imaging element.

REFERENCE SIGNS LIST

10 IMAGING ELEMENT
11 IMAGING SECTION
12 VERTICAL SCANNING CIRCUIT
13 HORIZONTAL SCANNING CIRCUIT
13$a$ MULTIPLEXER
14 CAPACITANCE ADDITION CIRCUIT
14$a$ MULTIPLEXER
14$b$ CAPACITOR
14$c$ SWITCH
15 AD CONVERSION CIRCUIT
16 FULLY CONNECTED PROCESSING SECTION
17 STORAGE SECTION
17$a$ REGISTER
18 CONTROL SECTION
20 CONVOLUTION CIRCUIT
20A CONVOLUTION CIRCUIT
110 PIXEL
121 PIXEL SIGNAL LINE
122 VERTICAL SIGNAL LINE
150 POOLING CIRCUIT
300 IMAGING DEVICE
301 OPTICAL SYSTEM

The invention claimed is:

1. An imaging element, comprising:

an imaging section in which a first plurality of pixels is arranged in a matrix, wherein each pixel of the first plurality of pixels includes a photoelectric conversion element;

a convolution circuit configured to execute convolution processing on a plurality of pixel signals based on a convolution coefficient, wherein the plurality of pixel signals are analog signals, each of the plurality of pixel signals is output from the first plurality of pixels, and the convolution circuit includes:

a horizontal scanning circuit configured to select, based on the convolution coefficient, a second plurality of pixels of the first plurality of pixels, wherein the plurality of pixel signals is output from the selected second plurality of pixels; and an addition circuit configured to add, based on the convolution coefficient, each pixel signal of the plurality of pixel signals output from the selected second plurality of pixels; and a pooling circuit configured to execute pooling processing on the plurality of pixel signals subjected to the convolution processing.

2. The imaging element according to claim 1, further comprising a fully integrated processing section that performs fully integrated processing on the plurality of pixel signals that has been subjected to the pooling processing.

3. The imaging element according to claim 1, wherein the addition circuit includes a multiplexer for setting the convolution coefficient and a plurality of capacitors.

4. The imaging element according to claim 1, wherein the addition circuit includes a plurality of amplifiers configured to set the convolution coefficient.

5. The imaging element according to claim 1, further comprising a storage section configured to store the convolution coefficient.

6. The imaging element according to claim 1, further comprising a control section configured to control the convolution circuit and the pooling circuit based on the convolution coefficient.

7. The imaging element according to claim 6, wherein the control section is further configured to restrict or permit the convolution processing and the pooling processing based on an input signal input to the control section.

8. The imaging element according to claim 1, wherein the convolution coefficient is a convolution filter, and the convolution circuit is further configured to:

shift the convolution filter in a specific movement amount, and execute the convolution processing based on the shift of the convolution filter.

9. The imaging element according to claim 1, wherein the convolution coefficient is a convolution filter including zero.

10. An imaging device, comprising:

an imaging element; and an optical system configured to form an image of light on a light receiving surface of the imaging element, wherein the imaging element includes:

an imaging section in which a first plurality of pixels is arranged in a matrix, wherein each pixel of the first plurality of pixels includes a photoelectric conversion element;

a convolution circuit configured to execute convolution processing on a plurality of pixel signals based on a convolution coefficient, wherein the plurality of pixel signals are analog signals, each of the plurality of pixel signals is output from the first plurality of pixels, and the convolution circuit includes:

a horizontal scanning circuit configured to select, based on the convolution coefficient, a second plurality of pixels of the first plurality of pixels, wherein the plurality of pixel signals is output from the selected second plurality of pixels; and an addition circuit configured to add, based on the convolution coefficient, each pixel signal of the plurality of pixel signals output from the selected second plurality of pixels; and a pooling circuit configured to execute pooling processing on the plurality of pixel signals subjected to the convolution processing.

\* \* \* \* \*